United States Patent
Chung

(10) Patent No.: US 11,303,515 B2
(45) Date of Patent: *Apr. 12, 2022

(54) IP MPLS POP VIRTUALIZATION AND FAULT TOLERANT VIRTUAL ROUTER

(71) Applicant: BCE INC., Verdun (CA)

(72) Inventor: Ting Wo Chung, Scarborough (CA)

(73) Assignee: BCE INC., Verdun (CA)

( * ) Notice: Subject to any disclaimer, the term of this patent is extended or adjusted under 35 U.S.C. 154(b) by 312 days.

This patent is subject to a terminal disclaimer.

(21) Appl. No.: 15/845,332

(22) Filed: Dec. 18, 2017

(65) Prior Publication Data

US 2018/0123874 A1 May 3, 2018

Related U.S. Application Data

(63) Continuation of application No. 14/425,092, filed as application No. PCT/CA2013/000756 on Aug. 30, 2013, now Pat. No. 9,847,910.

(Continued)

(51) Int. Cl.
| | |
|---|---|
| H04L 12/24 | (2006.01) |
| H04L 12/713 | (2013.01) |
| H04L 12/723 | (2013.01) |
| H04L 12/939 | (2013.01) |
| H04L 12/931 | (2013.01) |
| H04L 29/06 | (2006.01) |
| H04L 41/082 | (2022.01) |
| H04L 45/586 | (2022.01) |
| H04L 45/50 | (2022.01) |
| H04L 49/55 | (2022.01) |
| H04L 49/00 | (2022.01) |
| H04L 49/60 | (2022.01) |
| H04L 69/00 | (2022.01) |

(52) U.S. Cl.
CPC ............ *H04L 41/082* (2013.01); *H04L 45/50* (2013.01); *H04L 45/586* (2013.01); *H04L 49/557* (2013.01); *H04L 49/602* (2013.01); *H04L 49/70* (2013.01); *H04L 69/02* (2013.01)

(58) Field of Classification Search
None
See application file for complete search history.

(56) References Cited

U.S. PATENT DOCUMENTS

| | | | |
|---|---|---|---|
| 8,542,574 B2 * | 9/2013 | Hidle | H04L 1/24 370/216 |
| 2004/0103209 A1 * | 5/2004 | Kinoshita | H04L 47/10 709/238 |

(Continued)

*Primary Examiner* — Younes Naji

(57) ABSTRACT

A method of configuring at least one switch involves configuring the at least one switch to direct communication to at least one of a plurality of computers according to at least one outcome of simulated interaction of a plurality of virtual network routers. A method of simulating interaction of a plurality of virtual network routers involves: causing a first at least one processor circuit to simulate the interaction of the plurality of virtual network routers; and causing a second at least one processor circuit, different from the first at least one processor circuit, to simulate the interaction of the plurality of virtual network routers redundantly to the simulated interaction of the plurality of virtual network routers on the first at least one processor circuit. Apparatuses and computer-readable media are also disclosed.

17 Claims, 19 Drawing Sheets

Related U.S. Application Data

(60) Provisional application No. 61/695,841, filed on Aug. 31, 2012.

(56) References Cited

U.S. PATENT DOCUMENTS

| | | | | |
|---|---|---|---|---|
| 2005/0018612 A1* | 1/2005 | Fitzgerald | ............... | H04L 45/22 370/248 |
| 2005/0135369 A1* | 6/2005 | Galand | ................... | H04L 45/04 370/392 |
| 2009/0028138 A1* | 1/2009 | Lim | .................. | H04L 29/12556 370/356 |
| 2009/0154461 A1* | 6/2009 | Kitani | .................. | H04L 45/586 370/392 |
| 2009/0313362 A1* | 12/2009 | Duggan | .................. | H04L 45/04 709/223 |
| 2010/0027546 A1* | 2/2010 | Gibbons | ................. | H04L 45/02 370/392 |
| 2011/0149962 A1* | 6/2011 | Ait-Ameur | ............ | H04L 45/50 370/392 |
| 2012/0051259 A1* | 3/2012 | Gintis | .................... | H04L 45/50 370/253 |
| 2013/0250963 A1* | 9/2013 | Zhao | .................... | H04L 47/724 370/400 |
| 2013/0339545 A1* | 12/2013 | Shenoi | .................... | H04L 47/24 709/240 |
| 2014/0195666 A1* | 7/2014 | Dumitriu | ........... | H04L 41/5038 709/223 |

* cited by examiner

Network Topology Computing Virtual Machine Codes 214

| | |
|---|---|
| Physical Network Topology Database | 216 |
| Virtual Network Topology Creation Program Codes | 266 |
| Virtual Network Topology Database | 268 |
| Receive Routing Message Program Codes | 288 |
| Simulate Protocol Interaction Program Codes | 312 |

FIG. 4

Network Topology Database Entry 218

| | |
|---|---|
| Router ID | 220 |
| Network Address | 222 |
| 224 — Router ID of Neighbor Router | |

FIG. 5

IP Packet Forwarding Table 349

| | Network Destination Address 378 | Mask 380 | Next Hop Physical Address 382 | Label 384 |
|---|---|---|---|---|
| 370 | 169.114.72.15 | 255.255.255.255 | 08:8e:a9:90:de:a4 | 101101... |
| | 169.114.220.202 | 255.255.255.255 | 08:8e:a9:16:2f:a4 | 011101... |
| | 169.114.6.102 | 255.255.255.255 | 08:8e:a9:f7:2e:82 | 010111... |
| | 169.114.28.42 | 255.255.255.255 | 08:8e:a9:2c:c9:f0 | 110110... |
| | 169.114.28.41 | 255.255.255.255 | 08:8e:a9:16:de:f6 | 101011... |
| 372 | 169.114.28.0 | 255.255.255.240 | d8:62:30:27:16:24<br>d8:62:30:42:29:02 | 001010... |
| | 169.114.72.0 | 255.255.255.0 | 1c:a4:2e:41:2f:79 | 011010... |
| | 169.114.220.0 | 255.255.255.0 | 48:a8:de:92:6e:f2 | 010010... |
| | 169.114.6.0 | 255.255.255.0 | dc:84:9c:c3:22:1d | 100101... |
| 374 | 169.115.0.0 | 255.255.0.0 | 48:d3:e7:62:dc:19 | 101001... |
| | 169.116.0.0 | 255.255.0.0 | 3c:86:70:61:7a:09 | 011001... |
| 376 | 0.0.0.0 | 0.0.0.0 | 18:39:2d:0f:d4:32 | 110010... |

FIG. 17

Provider Edge MPLS Packet Forwarding Table 350

| Incoming Label | Next Hop Physical Address | Instruction | Outgoing Label |
|---|---|---|---|
| 386~ 101110... | 18:39:2d:0f:d4:32 | Swap | 010100... |
| 388~ 110011... | dc:84:9c:c3:22:1d | Pop | |
| 001011... | 18:39:2d:0f:d4:32 | Swap | 010001... |
| 390~ 111010... | 48:a8:de:92:6e:f2 | Push | 111011... |

FIG. 18

Switch Table 368

| Label | Switch to Port |
|---|---|
| 400~ 101101... | 1 |
| 011101... | 2 |
| 010111... | 3 |
| 110110... | 4 |
| 101011... | 4 |
| 001010... | 5 |
| 011010... | 1 |
| 010010... | 2 |
| 100101... | 3 |
| 402~ 101001... | 4 |
| 011001... | 4 |
| 110010... | 4 |
| 101110... | 4 |
| 404~ 110011... | 3 |
| 001011... | 4 |
| 111010... | 2 |

FIG. 19

IP MPLS POP VIRTUALIZATION AND FAULT TOLERANT VIRTUAL ROUTER

CROSS-REFERENCE TO RELATED APPLICATION

This application is a Continuation of U.S. application Ser. No. 14/425,092, which is a National Phase entry of International Application No. PCT/CA2013/000756 filed Aug. 30, 2013 claims the benefit of and any priority to U.S. provisional patent application No. 61/695,841 filed on Aug. 31, 2012, the entire contents of which are incorporated by reference herein.

FIELD

This disclosure relates generally to methods of and apparatuses for configuring at least one switch in a virtualized point of presence ("PoP").

RELATED ART

In general, an internet includes two or more interconnected computer networks. One particular internet, the Internet, is widely used to facilitate communication between a large number of computers in numerous homes, businesses, and academic and research institutions, for example. Often, such computers communicate over relatively local computer networks such as local area networks ("LANs"), campus area networks ("CANs"), and metropolitan area networks ("MANs"), for example. Internet service providers ("ISPs") often maintain one or more wide area networks ("WANs") that communicate with such relatively local networks and that may also span large geographical areas. A WAN is often interconnected with one or more WANs of the same or of other ISPs. Accordingly, such WANs may interconnect numerous computers over various interconnected networks, and are thus a significant part of the modern Internet backbone.

The Internet includes numerous routers that receive packets of data from one network and route the packets to other networks according to one or more of various routing protocols. In general, an Internet Protocol ("IP") packet includes a destination IP address identifying a destination computer, and when a router receives an IP packet, the router may identify another router or other computer (sometimes called a "next hop") in the Internet that is along a route towards the destination computer identified by the destination IP address. A router may also receive a Multiprotocol Label Switching ("MPLS") packet that includes a label that indicates a route from one router in the Internet to another, and possibly distant, router in the Internet. An MPLS router may function as a label edge router ("LER") that adds (or "pushes") an MPLS label onto an incoming packet when the packet enters an MPLS route, and that removes (or "pops") an MPLS label off of an outgoing packet when the packet completes an MPLS route.

A Point of Presence ("PoP") is a physical location where equipment of the ISP is located. Within the PoP, connections or interfaces are made between a WAN and various relatively local networks (such as one or more LANs, CANs, or MANs, for example) in a particular geographical area. In order to facilitate one or both of IP and MPLS routing to connect such relatively local networks to a WAN, such a PoP may have to include numerous routers of different types. Such routers are generally commercially available as discrete apparatuses. In other words, hardware, an operating system, and applications are generally incorporated into individual discrete apparatuses for particular predefined functions, and such apparatuses may have limited configurability and scalability. Therefore, designers of known PoPs must choose from a limited variety of commercially available routers to implement desired functions of a PoP. A large number of such routers may be required to connect various networks of potentially differing protocols to a WAN. Further, commercially available routers may have a limited number of ports to connect to relatively local networks, and still additional routers may be required merely to aggregate connections between networks and other routers.

Therefore, many routers may be required in a complex topology in order for a known PoP to connect the various local networks of the PoP with their various protocols to a WAN. Each router generally requires a high-speed interface to interconnect to other router, and numerous entire routers may have to be added or replaced in order to upgrade a PoP for additional local networks or additional protocols. Such numerous and various routers, including such duplication of such high-speed interfaces, can significantly increase the cost of creating and maintaining a PoP.

Also, different routers from different suppliers often cannot function together in a single PoP. Such limited modularity can limit the choice of suppliers for such routers in a PoP. Further, such incompatibilities between routers of different suppliers can be a barrier to new router suppliers to entering the router market, which can limit competition among router suppliers and further increase costs of creating and maintaining PoPs.

Known PoPs may support various services, such as: Border Gateway Protocol ("BGP") routing table services; Open Systems Interconnection ("OSI") layer three (network layer) virtual private network ("VPN") services; any-to-any broadcast-intensive OSI layer two (data link layer) services such as virtual private LAN services ("VPLS") and other Metro Ethernet Forum ("MEF") services; mobility backhaul services; high-availability services requiring an MPLS traffic engineering feature; multicast features such as broadcast video and Internet Protocol television ("IPTV"); and broadband remote access server ("BRAS") services, residential Internet services, or other services with many digital subscriber line access multiplexers ("DSLAMs"). In known PoPs, edge routers must be configured to support all of those services, but configuring an edge router to support all of those services can raise concerns for scalability, security, availability, and feature conflicts, for example.

Further, fault tolerance in known PoPs can be costly. A backup (or "hot standby") router for each router in a PoP may be very costly given the high number of routers in many PoPs and the high cost of many routers, even though the backup routers are often not utilized. Even with the high cost of a backup router for each router in the PoP, only one backup for each router may be insufficient for desired reliability of the PoP because both the active and hot standby routers can fail simultaneously. Further, service may be interrupted if the routers are upgraded or otherwise replaced.

SUMMARY

According to one embodiment, there is provided a method of configuring at least one switch, the method comprising configuring the at least one switch to direct communication to at least one of a plurality of computers according to at least one outcome of simulated interaction of a plurality of virtual network routers.

According to another embodiment, there is provided an apparatus for configuring at least one switch operable to communicate with a plurality of computers, the apparatus comprising: a means for simulating interaction of a plurality of virtual network routers; and a means for configuring the at least one switch to direct communication to at least one of the plurality of computers according to at least one outcome of the means for simulating.

According to another embodiment, there is provided an apparatus for configuring at least one switch operable to communicate with a plurality of computers, the apparatus comprising: at least one communication interface operable to communicate with the at least one switch; and at least one processor circuit in communication with the at least one communication interface and configured to simulate interaction of a plurality of virtual network routers, and direct the at least one communication interface to configure the at least one switch to direct communication to at least one of the plurality of computers according to at least one outcome of the simulated interaction of the plurality of virtual network routers.

According to another embodiment, there is provided a computer-readable medium comprising instructions stored thereon for directing at least one computer to: simulate interaction of a plurality of virtual network routers; and configure at least one switch to direct communication to at least one of a plurality of computers according to at least one outcome of the simulated interaction of the plurality of virtual network routers.

According to another embodiment, there is provided a method of simulating interaction of a plurality of virtual network routers, the method comprising: causing a first at least one processor circuit to simulate the interaction of the plurality of virtual network routers; and causing a second at least one processor circuit, different from the first at least one processor circuit, to simulate the interaction of the plurality of virtual network routers redundantly to the simulated interaction of the plurality of virtual network routers on the first at least one processor circuit.

According to another embodiment, there is provided an apparatus for simulating interaction of a plurality of virtual network routers, the apparatus comprising: a first at least one processor circuit configured to simulate the interaction of the plurality of virtual network routers; and a second at least one processor circuit, different from the first at least one processor circuit, configured to simulate the interaction of the plurality of virtual network routers redundantly to the simulated interaction of the plurality of virtual network routers on the first at least one processor circuit.

Other aspects and features will become apparent to those ordinarily skilled in the art upon review of the following description of illustrative embodiments in conjunction with the accompanying figures.

BRIEF DESCRIPTION OF THE DRAWINGS

In drawings of illustrative embodiments:

FIG. 4 is a schematic illustration of network topology computing virtual machine codes of a memory of the routing server chassis of FIG. 2;

FIG. 5 is a schematic illustration of a network topology database entry for the network topology computing virtual machine codes of FIG. 4;

FIG. 17 is a schematic illustration of an example of contents of an IP packet forwarding table of the provider edge packet forwarding interface of FIG. 15;

FIG. 18 is a schematic illustration of an example of contents of an MPLS provider edge packet forwarding table of the provider edge packet forwarding interface of FIG. 15;

FIG. 19 is a schematic illustration of an example of contents of a switch table of the switch fabric of FIG. 16;

DETAILED DESCRIPTION

Figure 1:
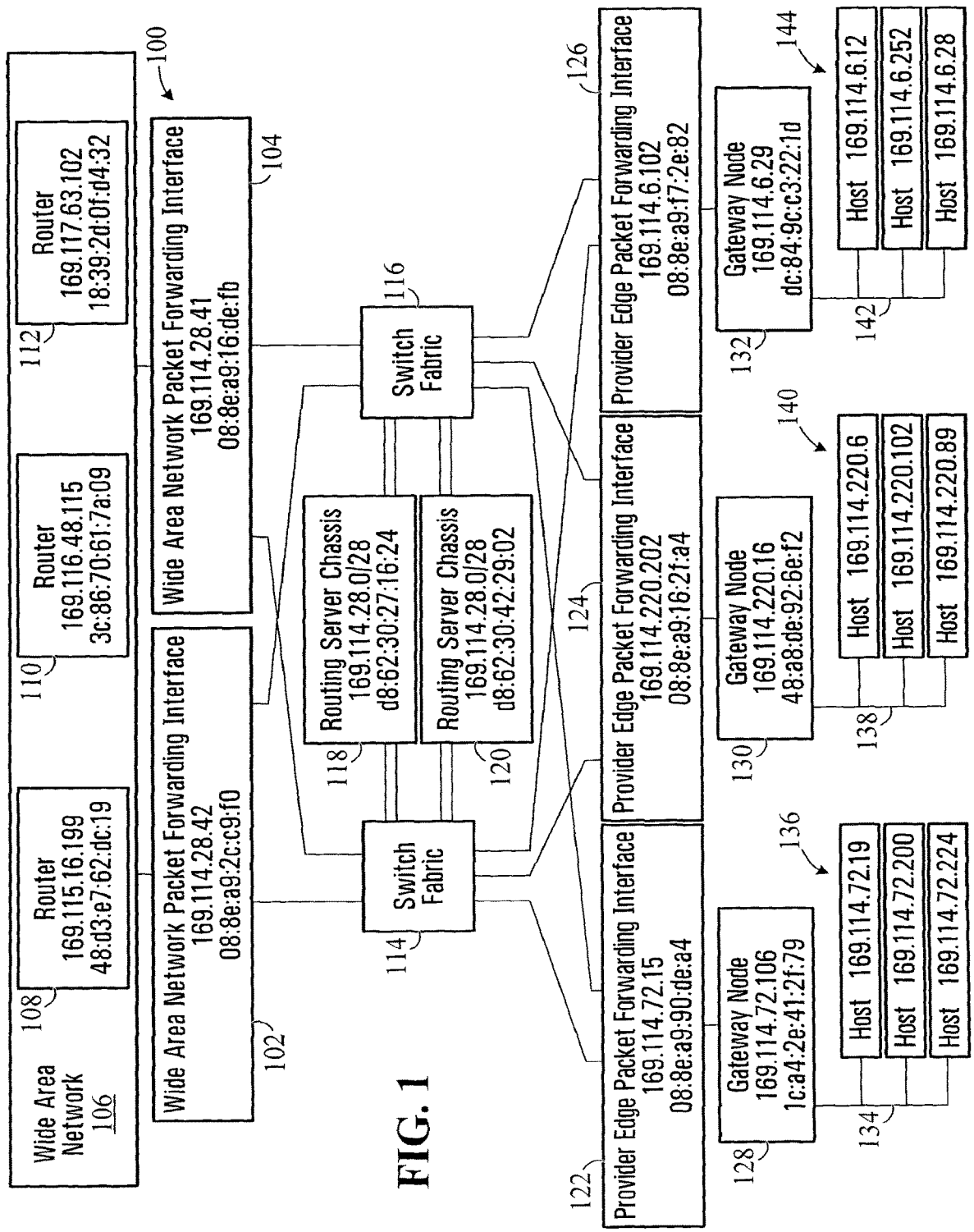
FIG. 1 is a schematic illustration of a system for directing communication between a plurality of computers according to one embodiment.

Referring to FIG. 1, a system for directing communication between a plurality of computers according to one embodiment is shown generally at 100. The system 100 includes a wide area network ("WAN") packet forwarding interface 102 and a WAN packet forwarding interface 104, both of which are in communication with a WAN 106. Although FIG. 1 illustrates only two WAN packet forwarding interfaces 102 and 104 for simplicity, alternative embodiments may include more than two WAN packet forwarding interfaces. The WAN 106 in the embodiment shown is a WAN in the Internet and includes core Internet routers 108, 110, and 112 in communication with the WAN packet forwarding interfaces 102 and 104 over the WAN 106. The core Internet routers 108, 110, and 112 may communicate with other networks, for example with other WANs or with other points of presence ("PoPs"). The system 100 also includes a switch fabric 114 and a switch fabric 116, both of which are in communication with both of the WAN packet forwarding interfaces 102 and 104. The system 100 also includes a routing server chassis 118 and a routing server chassis 120, both of which are in communication with both of the switch fabrics 114 and 116. The system 100 also includes a provider edge packet forwarding interface 122, a provider edge packet forwarding interface 124, and a provider edge packet forwarding interface 126, all of which are in communication with both of the switch fabrics 114 and 116. Although FIG. 1 illustrates only three provider edge packet forwarding interfaces 122, 124, and 126, alternative embodiments may include more than three (or as many as needed and supported by the switch fabric capacity) provider edge packet forwarding interfaces. In the embodiment of FIG. 1, connections facing the WAN 106 communicate with the system 100 through the WAN packet forwarding interfaces 102 and 104, and not through any of the provider edge packet forwarding interfaces 122, 124, and 126.

In the embodiment shown, the provider edge packet forwarding interface 122 is in communication with a gateway node 128, the provider edge packet forwarding interface 124 is in communication with a gateway node 130, and the provider edge packet forwarding interface 126 is in communication with a gateway node 132. The gateway node 128 facilitates communication over a customer network 134 with hosts shown generally at 136, the gateway node 130 facilitates communication over a customer network 138 with hosts shown generally at 140, and the gateway node 132 facilitates communication over a customer network 142 with hosts shown generally at 144. Each of the customer networks 134, 138, and 142 may, for example, be a wired or wireless network such as a local area network ("LAN"), a campus area network ("CAN"), or a metropolitan area network ("MAN"), and each of the hosts 136, 140, and 144 may, for example, be a personal computer, tablet computer, mobile device, or other network node. In the embodiment of FIG. 1, connections facing the hosts 136, 140, and 144 communicate with the system 100 through the provider edge packet forwarding interfaces 122, 124, and 126, and not through either of the WAN packet forwarding interfaces 102 and 104.

FIG. 1 illustrates various Internet Protocol ("IP") addresses of the gateway nodes 128, 130, and 132 and of the hosts 136, 140, and 144, and those IP addresses are IP addresses by which computers outside of the customer network 134 may identify the gateway node 128 and the hosts 136, by which computers outside of the customer network 138 may identify the gateway node 130 and the hosts 140, and by which computers outside of the customer network 142 may identify the gateway node 132 and the hosts 144. However, within the customer networks 134, 138, and 142, the gateway nodes 128, 130, and 132 and of the hosts 136, 140, and 144 may have additional IP addresses (such as private IP addresses, for example) for use within the customer networks 134, 138, and 142, and the customer networks 134, 138, and 142 may use network address translation ("NAT") to convert between such IP addresses. The IP addresses described herein may be statically or dynamically allocated. Also, although the network addresses in the embodiment shown are Internet Protocol Version 4 ("IPv4") addresses, network addresses in alternative embodiments may include other network addresses such as Internet Protocol Version 6 ("IPv6") addresses for example.

In general, in the embodiment shown, one or both of the routing server chassis 118 and 120 may configure the WAN packet forwarding interfaces 102 and 104, the switch fabrics 114 and 116, and the provider edge packet forwarding interfaces 122, 124, and 126 as described below such that the system 100 may function as an Internet PoP to facilitate communication between the hosts 136, 140, and 144 and other computers on the Internet. However, alternative embodiments are not limited to the Internet, and may include various different hosts and networks.

For example, although the three hosts 136, the three hosts 140, and the three hosts 144 are shown in the embodiment of FIG. 1, alternative embodiments may include any number of hosts on the customer networks 134, 138, and 142. Also, although three customer networks 134, 138, and 142 are shown in the embodiment of FIG. 1, alternative embodiments may include more or fewer customer networks in communication with the system 100. Such alternative embodiments may include a respective provider edge packet forwarding interface for each customer network in communication with the system 100, and each such provider edge packet forwarding interface may be in communication with both of the switch fabrics 114 and 116. Also, although three core Internet routers 108, 110, and 112 are shown in the embodiment of FIG. 1, alternative embodiments may include more or fewer routers, and various different routers, in communication with the system 100 over one or more WANs. Further, FIG. 1 includes only illustrates one WAN 106, alternative embodiments may communicate with a plurality of WANs over respective WAN packet forwarding interfaces.

To configure the WAN packet forwarding interfaces 102 and 104, the switch fabrics 114 and 116, and the provider edge packet forwarding interfaces 122, 124, and 126, the routing server chassis 118 and 120 simulate interaction of a plurality of virtual routers, which in some embodiments may represent respective physical routers in an Internet PoP. Therefore, in some embodiments, the system 100 may replace physical routers in an Internet PoP. For simplicity, the virtual routers simulated by the routing server chassis 118 and 120 in the embodiment of FIG. 1 are identified in the Internet by IP addresses ranging from 169.114.28.0 to 169.114.28.15 inclusive. Such a range may be represented by a 28-bit prefix 169.114.28.0, or 169.114.28.0/28 as shown in FIG. 1. However, virtual routers in alternative embodiments may not share common prefixes of their network addresses.

Figure 2:
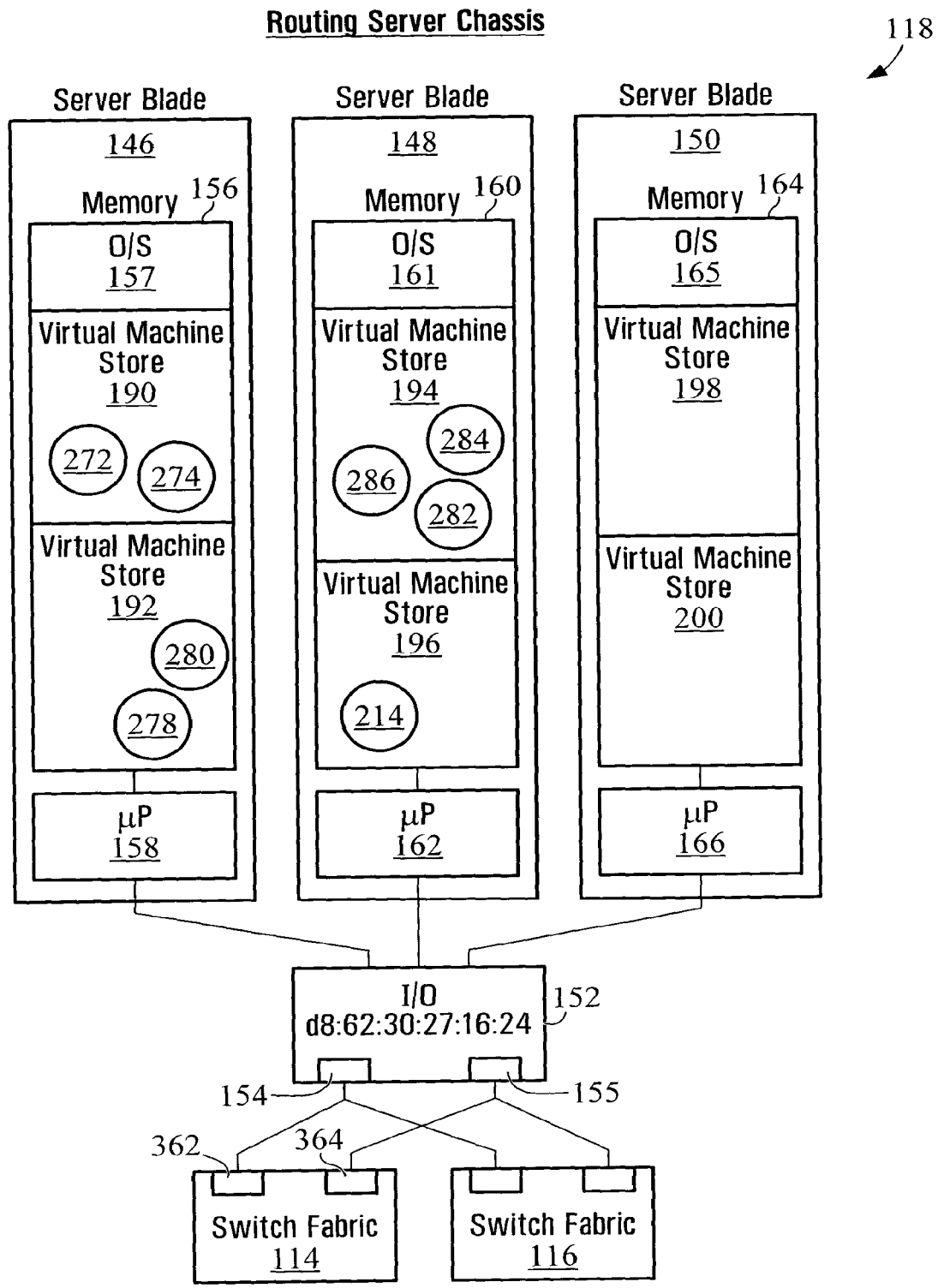
FIG. 2 is a schematic illustration of a routing server chassis of the system of FIG. 1.

Referring to FIG. 2, the routing server chassis 118 is illustrated schematically and includes a processor circuit or server blade 146, a processor circuit or server blade 148, a processor circuit or server blade 150, and an input and output ("I/O") interface 152. The I/O interface 152 includes a communication interface 154 in communication with respective ports of the switch fabrics 114 and 116 (also shown in FIG. 1) as described below. The communication interface 154 in the embodiment shown is a network port having a 48-bit media access control ("MAC") address d8:62:30:27:16:24 in hexadecimal notation. Although the physical addresses in the embodiment shown are 48-bit MAC addresses, physical addresses in other embodiments may include other physical addresses such as a 48-bit extended unique identifier (EUI-48™) or a 64-bit extended unique identifier (EUI-64™), for example. The I/O interface 152 also includes a communication interface 155 in communication with respective tables of the switch fabrics 114 and 116 (also shown in FIG. 1) as described below. Although the embodiment shown includes three server blades 146, 148, and 150, alternative embodiments may include more or fewer server blades.

The server blade 146 includes a memory 156 and a microprocessor 158 in communication with both the I/O interface 152 and the memory 156, the server blade 148 includes a memory 160 and a microprocessor 162 in communication with both the I/O interface 152 and the memory 160, and the server blade 150 includes a memory 164 and a microprocessor 166 in communication with both the I/O interface 152 and the memory 164. The memory 156 stores operating system ("O/S") program codes 157 for controlling system-level operations of the server blade 146, the memory 160 stores O/S program codes 161 for controlling system-level operations of the server blade 148, and the memory 164 stores O/S program codes 165 for controlling system-level operations of the server blade 150.

Figure 3:
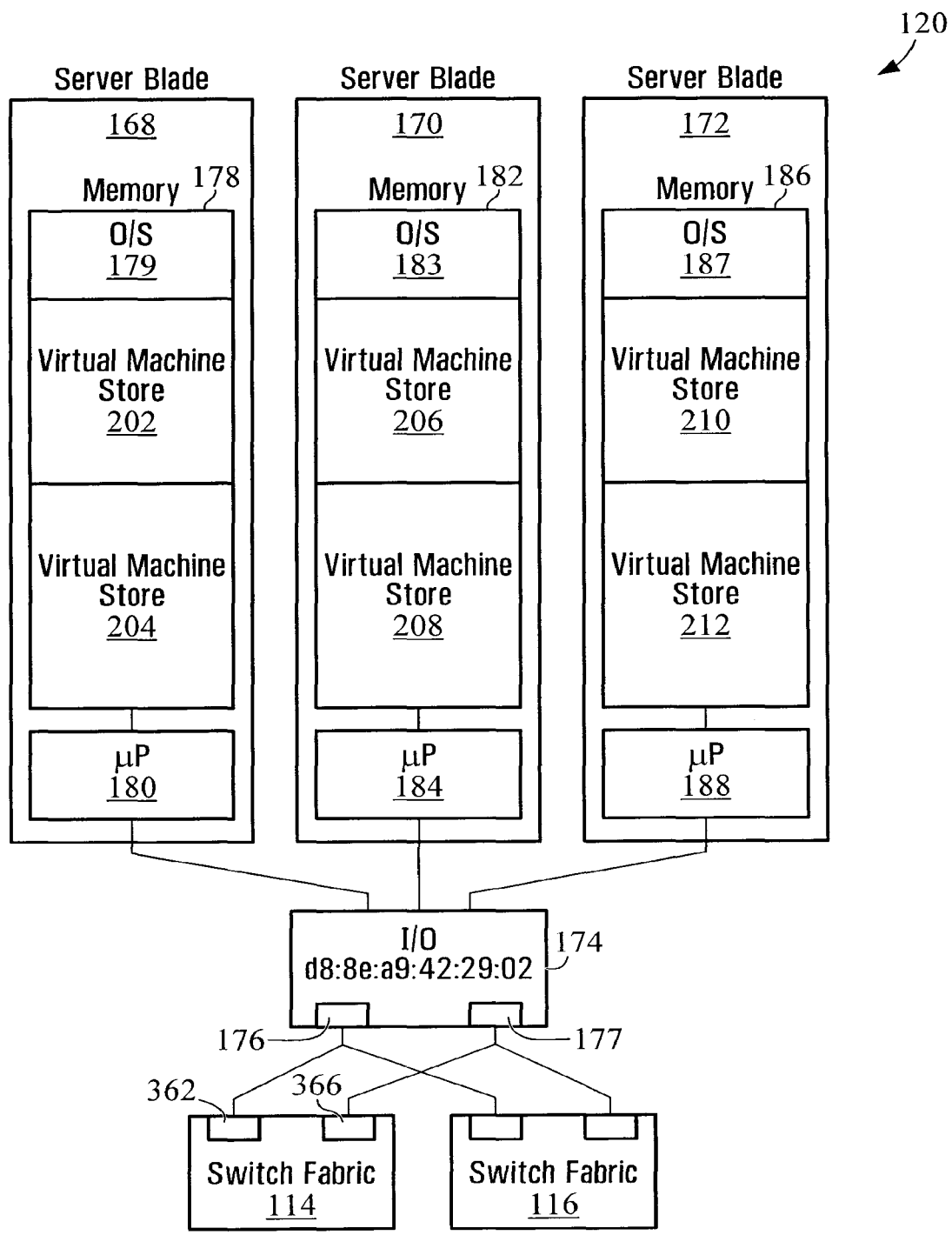
FIG. 3 is a schematic illustration of another routing server chassis of the system of FIG. 1.

Referring to FIG. 3, the routing server chassis 120 is illustrated schematically and includes a processor circuit or server blade 168, a processor circuit or server blade 170, a processor circuit or server blade 172, and an I/O interface 174. The I/O interface 174 includes a communication interface 176 in communication with respective ports of the switch fabrics 114 and 116 (also shown in FIG. 1) as described below. The communication interface 176 in the embodiment shown is a network port having a 48-bit MAC address d8:62:30:42:29:02 in hexadecimal notation. The I/O interface 174 also includes a communication interface 177 in communication with respective tables of the switch fabrics 114 and 116 (also shown in FIG. 1) as described below. Although the embodiment shown includes three server blades 168, 170, and 172, alternative embodiments may include more or fewer server blades.

The server blade 168 includes a memory 178 and a microprocessor 180 in communication with both the I/O interface 174 and the memory 178, the server blade 170 includes a memory 182 and a microprocessor 184 in communication with both the I/O interface 174 and the memory 182, and the server blade 172 includes a memory 186 and a microprocessor 188 in communication with both the I/O interface 174 and the memory 186. The memory 178 stores O/S program codes 179 for controlling system-level operations of the server blade 168, the memory 182 stores O/S program codes 183 for controlling system-level operations of the server blade 170, and the memory 186 stores O/S program codes 187 for controlling system-level operations of the server blade 172.

Referring to FIGS. 2 and 3, the memories 156, 160, 164, 178, 182, and 186 may be implemented on one or more of the same or different computer-readable storage media, which in various embodiments may include one or more of a random access memory ("RAM"), a hard disc drive ("HDD"), and other computer-readable and computer-writable storage media for example. Further, in alternative embodiments (not shown), one or both of the routing server chassis 118 and the routing server chassis 120 may be partly or fully implemented using different hardware, which may include an application specific integrated circuit ("ASIC") for example.

Still referring to FIGS. 2 and 3, each of the memories 156, 160, 164, 178, 182, and 186 may in various embodiments also store one or more blocks of computer-readable codes, each of which may direct one of the microprocessors 158, 162, 166, 180, 184, and 188 to implement particular functions, or to implement a virtual machine to implement particular functions, such as those described below. In the embodiment of FIGS. 2 and 3, the memory 156 includes a virtual machine store 190 and a virtual machine store 192, each of which includes codes for directing the microprocessor 158 to implement a respective virtual machine, the memory 160 includes a virtual machine store 194 and a virtual machine store 196, each of which includes codes for directing the microprocessor 162 to implement a respective virtual machine, the memory 164 includes a virtual machine store 198 and a virtual machine store 200, each of which includes codes for directing the microprocessor 166 to implement a respective virtual machine, the memory 178 includes a virtual machine store 202 and a virtual machine store 204, each of which includes codes for directing the microprocessor 180 to implement a respective virtual machine, the memory 182 includes a virtual machine store 206 and a virtual machine store 208, each of which includes codes for directing the microprocessor 184 to implement a respective virtual machine, and the memory 186 includes a virtual machine store 210 and a virtual machine store 212, each of which includes codes for directing the microprocessor 188 to implement a respective virtual machine.

In the embodiment of FIG. 2, the virtual machine store 196 in the routing server chassis 118 also stores network topology computing virtual machine codes that, when accessed by a virtual machine implemented by codes in the virtual machine store 196, direct the microprocessor 162 to implement a network topology computing program. Referring to FIGS. 2 and 4, the network topology computing virtual machine codes are shown generally at 214 in FIG. 4 and include various blocks of codes, both blocks of program codes and blocks of storage codes, that the virtual machine implemented in the virtual machine store 196 can access to cause the microprocessor 162 to implement a network topology computing program.

As indicated above, the routing server chassis 118 simulates interaction of a plurality of virtual routers, which may represent respective physical routers. Such physical routers and their topology are represented in a physical network topology database 216 in the network topology computing virtual machine codes 214. The physical network topology database 216 stores any number of instances of a network topology database entry shown generally at 218 in FIG. 5, and each instance of the network topology database entry 218 in the physical network topology database 216 represents a particular physical router. In general, the network topology database entry 218 shown in FIG. 5 includes various fields, and an instance of the network topology database entry 218 in the physical network topology database 216 can store, in such fields, particular values associated with the physical router represented by the instance of the network topology database entry 218 in the physical network topology database 216.

Referring to FIG. 5, the network topology database entry 218 includes a router identifier field 220, which stores an integer to identify an instance of the network topology database entry 218 uniquely. The network topology database entry 218 also includes a network address field 222 for storing a network address such as an IP address of the router represented by an instance of the network topology database entry 218. The network topology database entry 218 also includes any number of neighbor router identifier fields 224, each for storing the router identifier of the router identifier field 220 of another instance of the network topology database entry 218 representing a neighbor router of the router represented by the instance of the network topology database entry 218.

Figure 6:
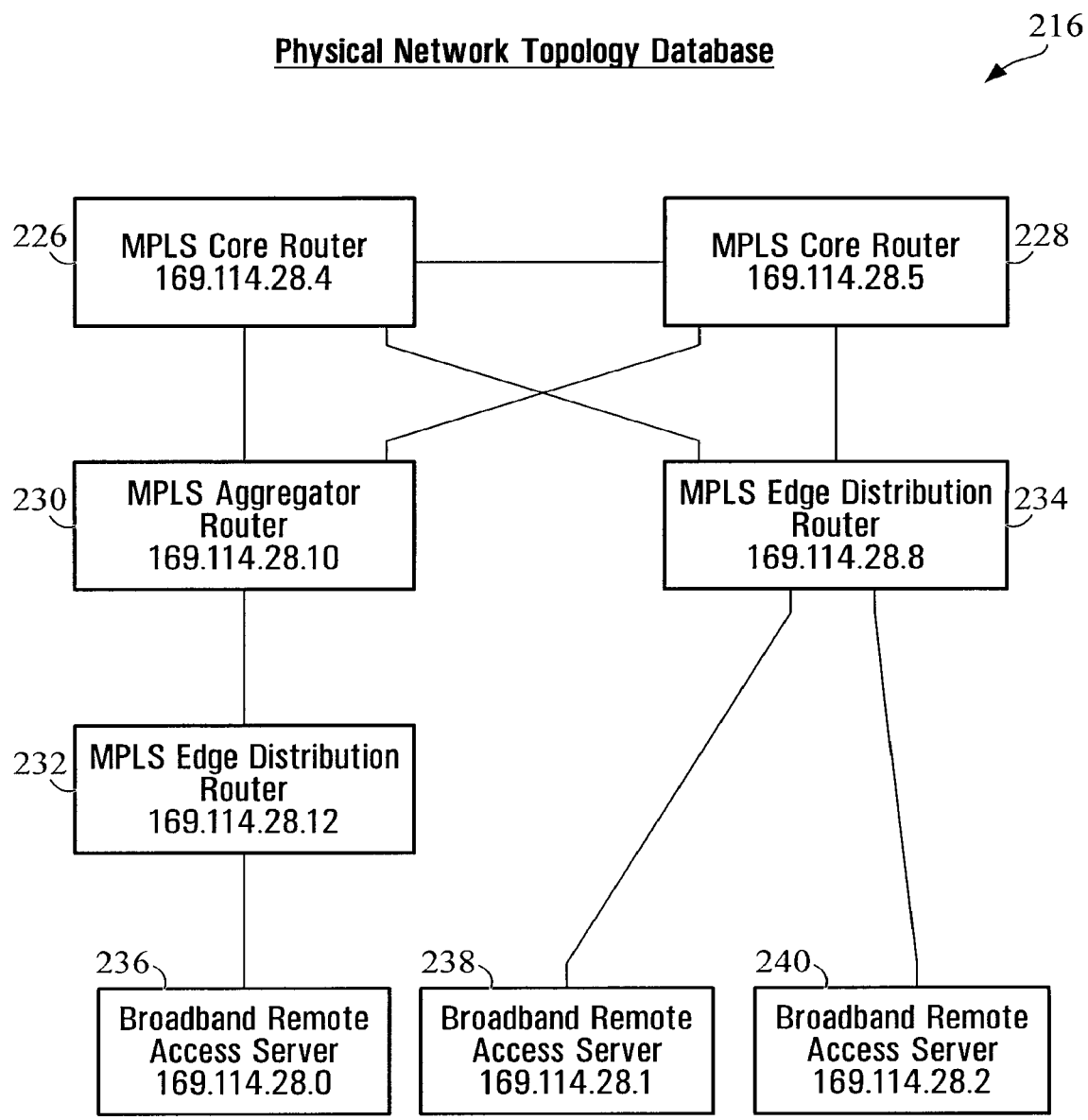
FIG. 6 is a schematic illustration of an example of contents of a physical network topology database of the network topology computing virtual machine codes of FIG. 4.

FIG. 6 illustrates an example of a representation of contents of the physical network topology database 216 including representations of a core router 226, a core router 228, a Multiprotocol Label Switching ("MPLS") aggregator router 230, an MPLS edge distribution router 232, an MPLS edge distribution router 234, a broadband remote access server router 236, a broadband remote access server router 238, and a broadband remote access server router 240. For simplicity, the example of FIG. 6 shows only the aforementioned eight routers. However, alternative embodiments may include more or fewer routers, and various different routers, and some alternative embodiments may include significantly more than eight routers in order to represent the numerous physical routers of some PoPs.

Referring to FIGS. 5 and 6, each of the routers 226, 228, 230, 232, 234, 236, 238, and 240 is represented by a respective instance of the network topology database entry 218 in the physical network topology database 216, and the neighbor router identifier fields 224 of such instances of the network topology database entry 218 in the physical network topology database 216 represent the neighbors of the routers 226, 228, 230, 232, 234, 236, 238, and 240 as shown in FIG. 6. For example, the neighbor router identifier fields 224 of the instance of the network topology database entry 218 in the physical network topology database 216 representing the core router 226 store the router identifiers of the router identifier fields 220 of the instances of the network topology database entry 218 in the physical network topology database 216 representing the core router 228, the MPLS aggregator router 230, and the MPLS edge distribution router 234. As another example, the neighbor router identifier fields 224 of the instance of the network topology database entry 218 in the physical network topology database 216 representing the broadband remote access server router 236 store the router identifier of the router identifier field 220 of the instance of the network topology database entry 218 in the physical network topology database 216 representing the MPLS edge distribution router 232, and the neighbor router identifier fields 224 of the instances of the network topology database entry 218 in the physical network topology database 216 representing the broadband remote access server routers 238 and 240 store the router identifier of the router identifier field 220 of the instance of the network topology database entry 218 in the physical network topology database 216 representing the MPLS edge distribution router 234.

Figure 7:
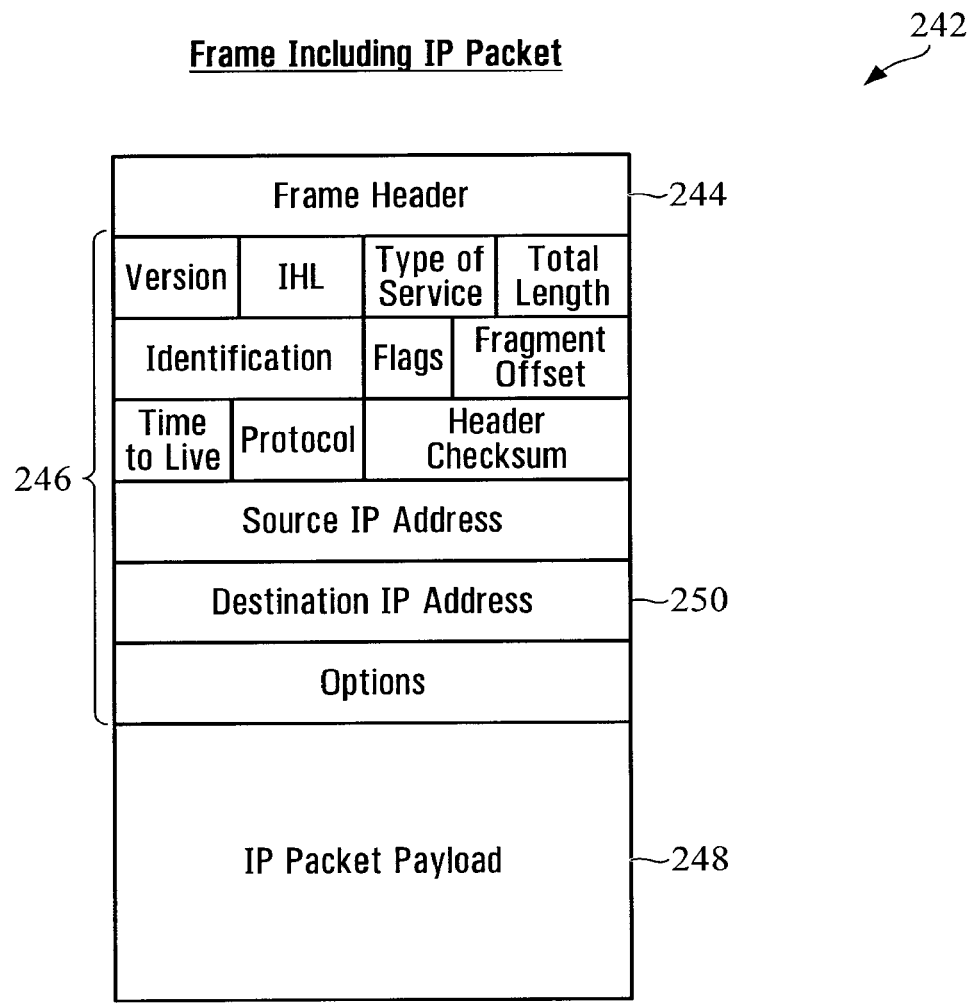
FIG. 7 is a schematic illustration of an example of a frame including an IP packet.

In the physical network topology shown in FIG. 6, the broadband remote access server routers 236, 238, and 240 are IP routers that send and receive frames including IP packets. In general, "frame" herein may refer to a unit of transmission in a link layer protocol, such as a unit of transmission in layer two (the data link layer) of the Open Systems Interconnection ("OSI") model (ISO/IEC 7498-1), for example. Referring to FIG. 7, an illustrative frame including an IP packet is shown generally at 242 and includes a frame header 244 according to a particular protocol by which the IP packet is transmitted. For example, if the broadband remote access server router 236 receives frames over an Ethernet network, then the frame header 244 may include an Ethernet frame header encoded with information including a destination MAC address. As another example, if the broadband remote access server router 236 receives frames over a Point-to-Point Protocol ("PPP") network, then the frame header 244 may include a PPP frame header. The frame 242 also includes an IP packet, which includes an IP packet header 246 and an IP packet payload 248. The IP packet header 246 includes various fields, including a destination IP address field 250 storing an IP address of a destination of the IP packet.

Figure 8:
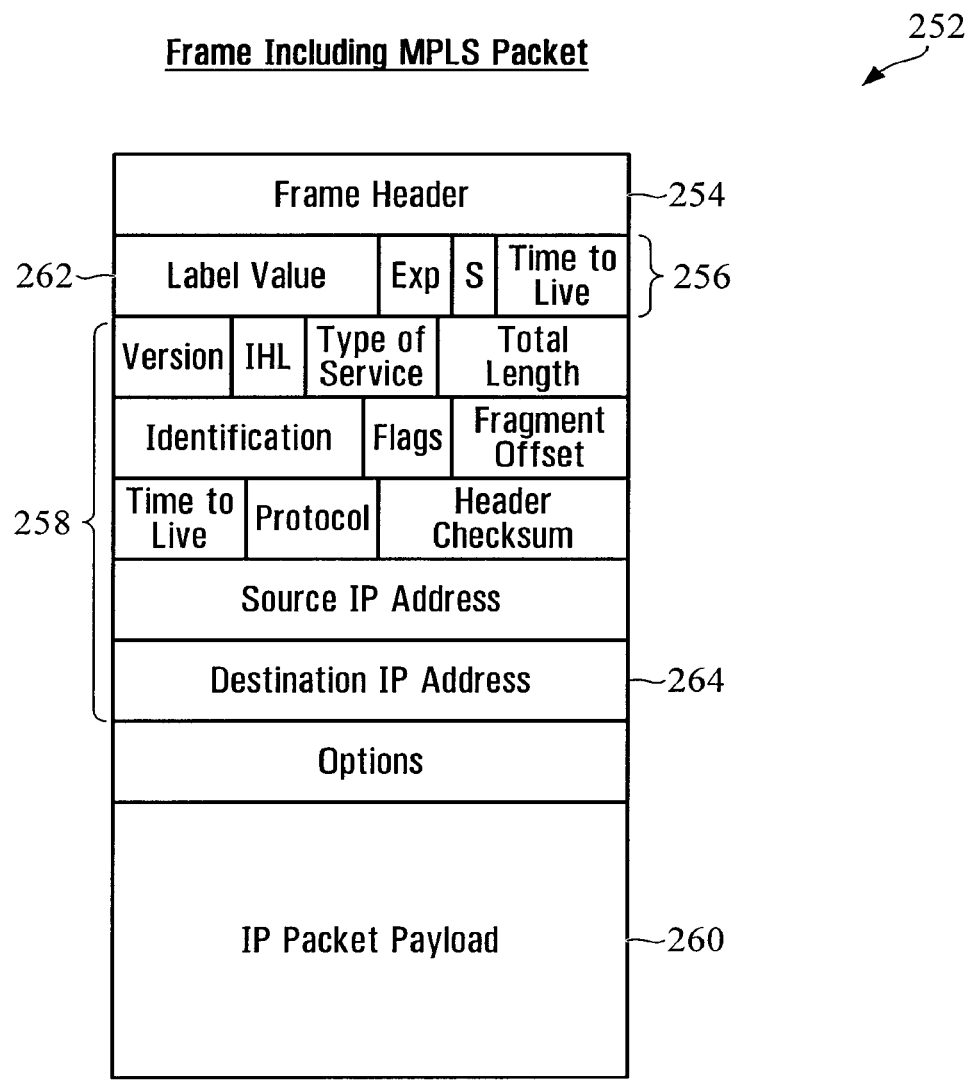
FIG. 8 is a schematic illustration of an example of a frame including an MPLS packet.

Still referring to the physical network topology shown in FIG. 6, the core routers 226 and 228 and the MPLS aggregator router 230 are MPLS routers that send and receive frames including MPLS packets. Referring to FIG. 8, an illustrative frame including an MPLS packet is shown generally at 252 and includes a frame header 254 according to a particular protocol by which the MPLS packet is transmitted. The frame 252 also includes an MPLS packet, which includes an MPLS packet header 256 and an IP packet including an IP packet header 258 and an IP packet payload 260. The MPLS packet header includes various fields, including a label field 262 storing an MPLS label, which may be a 20-bit label in some embodiments. Alternative embodiments may include different labels, which need not be MPLS labels in some embodiments. The IP packet header 258 also includes various fields, including a destination IP address field 264 storing an IP address of a destination of the IP packet.

In the physical network shown in FIG. 6, the MPLS edge distribution router 232 functions as a label edge router to push MPLS labels onto IP packets received from the broadband remote access server router 236 and destined to the core routers 226 and 228, and to pop MPLS labels off of packets received from the core routers 226 and 228 through the MPLS aggregator router 230 and destined to the broadband remote access server router 236. Likewise, the MPLS edge distribution router 234 functions as a label edge router to push MPLS labels onto IP packets received from the broadband remote access server routers 238 and 240 and destined to the core routers 226 and 228, and to pop MPLS labels off of packets received from the core routers 226 and 228 through the MPLS aggregator router 230 and destined to either of the broadband remote access server routers 238 and 240. Therefore, the packets that are sent to and received from the core routers 226 and 228 in the physical network topology shown in FIG. 6 are all MPLS packets, and the core routers 226 and 228 in the physical network topology shown in FIG. 6 are thus MPLS routers. However, alternative embodiments may include core routers that are only IP routers, or that are both MPLS routers and IP routers, for example. In summary, the physical network shown in FIG. 6 is both an IP and an MPLS network, although physical network topologies in alternative embodiments may include only IP networks or only MPLS networks, for example.

Referring back to FIG. 4, the network topology computing virtual machine codes 214 also include virtual network topology creation program codes 266 that the virtual machine implemented in the virtual machine store 196 can access to cause the microprocessor 162 (shown in FIG. 2) to convert the physical router topology represented in the physical network topology database 216 to a virtual network topology represented in a virtual network topology database 268 in the network topology computing virtual machine codes 214. The virtual network topology includes virtual connections between virtual routers, and such virtual connections need not be constrained by the physical configuration of the routing server chassis 118 and 120. The virtual network topology database 268 also stores instances of the network topology database entry 218 (shown in FIG. 5), and each such instance represents a particular virtual router and its neighbor virtual routers in a virtual network topology.

Figure 9:
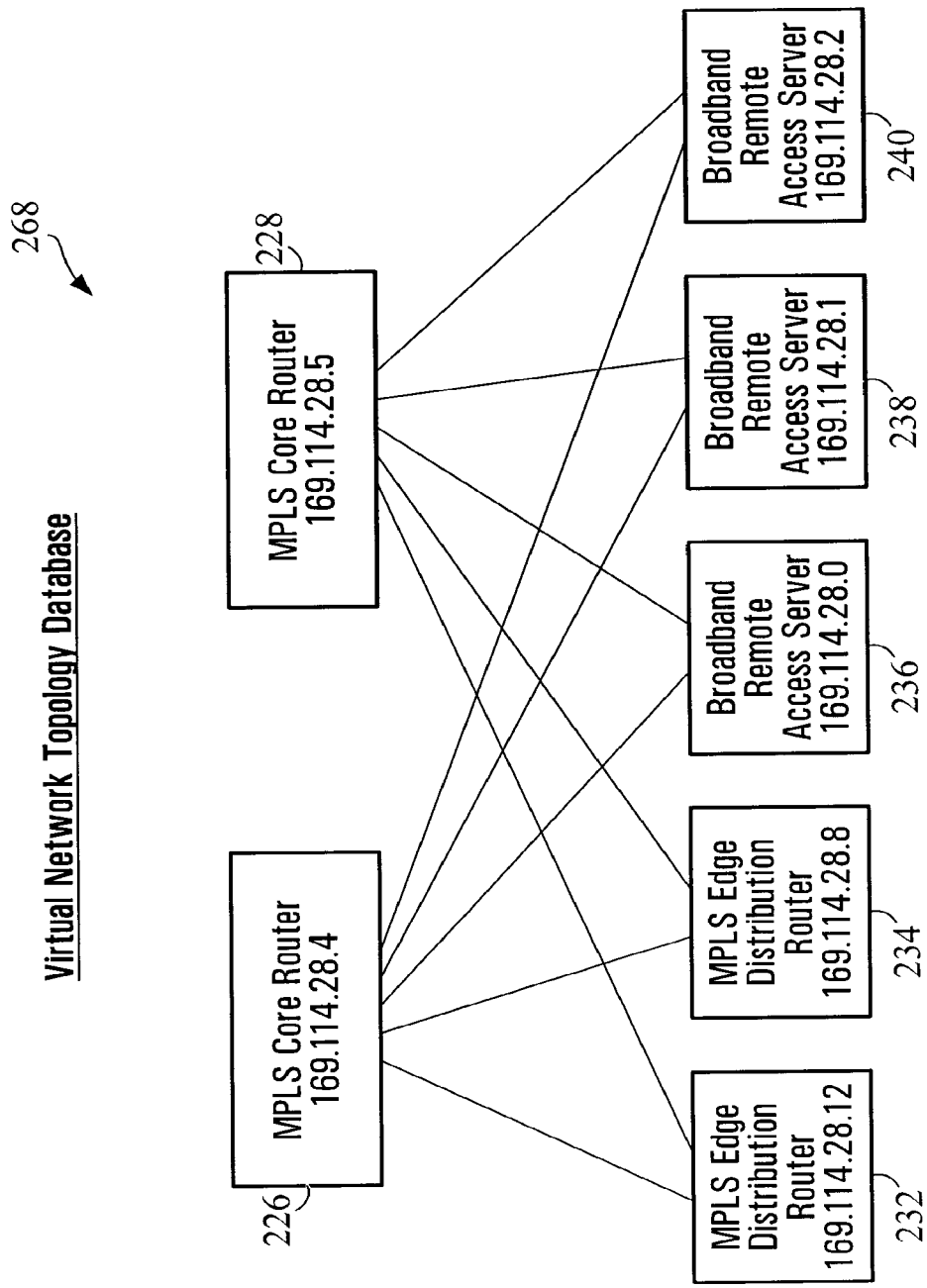
FIG. 9 is a schematic illustration of an example of contents of a virtual network topology database of the network topology computing virtual machine codes of FIG. 4.

FIG. 9 illustrates an example of a representation of contents of the virtual network topology database 268 after optimization, including representations of the core routers 226 and 228, the MPLS edge distribution router 232, the MPLS edge distribution router 234, and the broadband remote access server routers 236, 238, and 240 in a "single hierarchical tree" topology in which each of the MPLS edge distribution router 232, the MPLS edge distribution router 234, and the broadband remote access server routers 236, 238, and 240 is in communication only with the core routers 226 and 228. In the example of FIG. 9, the virtual network topology database 268 does not include a representation of the MPLS aggregator router 230 because omitting aggregator routers can simplify the virtual network topology. In general, physical routers have limited numbers of physical ports, and aggregator routers may be required to connect physical routers in a desired physical topology. However, virtual routers may have a greater number of virtual ports than physical routers (or may have an unlimited number of virtual ports), so the virtual network topology in the embodiment shown omits the MPLS aggregator router 230, and more generally, virtual network topologies in various embodiments may omit some or all aggregator routers. Alternatively, virtual network topologies in some embodiments may include representations of aggregator routers.

In the example of FIG. 9, the neighbor router identifier fields 224 of the instances of the network topology database entry 218 (shown in FIG. 5) in the virtual network topology database 268 representing the core routers 226 and 228 store the router identifiers of the router identifier fields 220 of the instances of the network topology database entry 218 in the virtual network topology database 268 representing the MPLS edge distribution router 232, the MPLS edge distribution router 234, and the broadband remote access server routers 236, 238, and 240, and the neighbor router identifier fields 224 of the instances of the network topology database entry 218 (shown in FIG. 5) in the virtual network topology database 268 representing the MPLS edge distribution router 232, the MPLS edge distribution router 234, and the broadband remote access server routers 236, 238, and 240 store the router identifiers of the router identifier fields 220 of the instances of the network topology database entry 218 in the virtual network topology database 268 representing the core routers 226 and 228.

Figure 10:
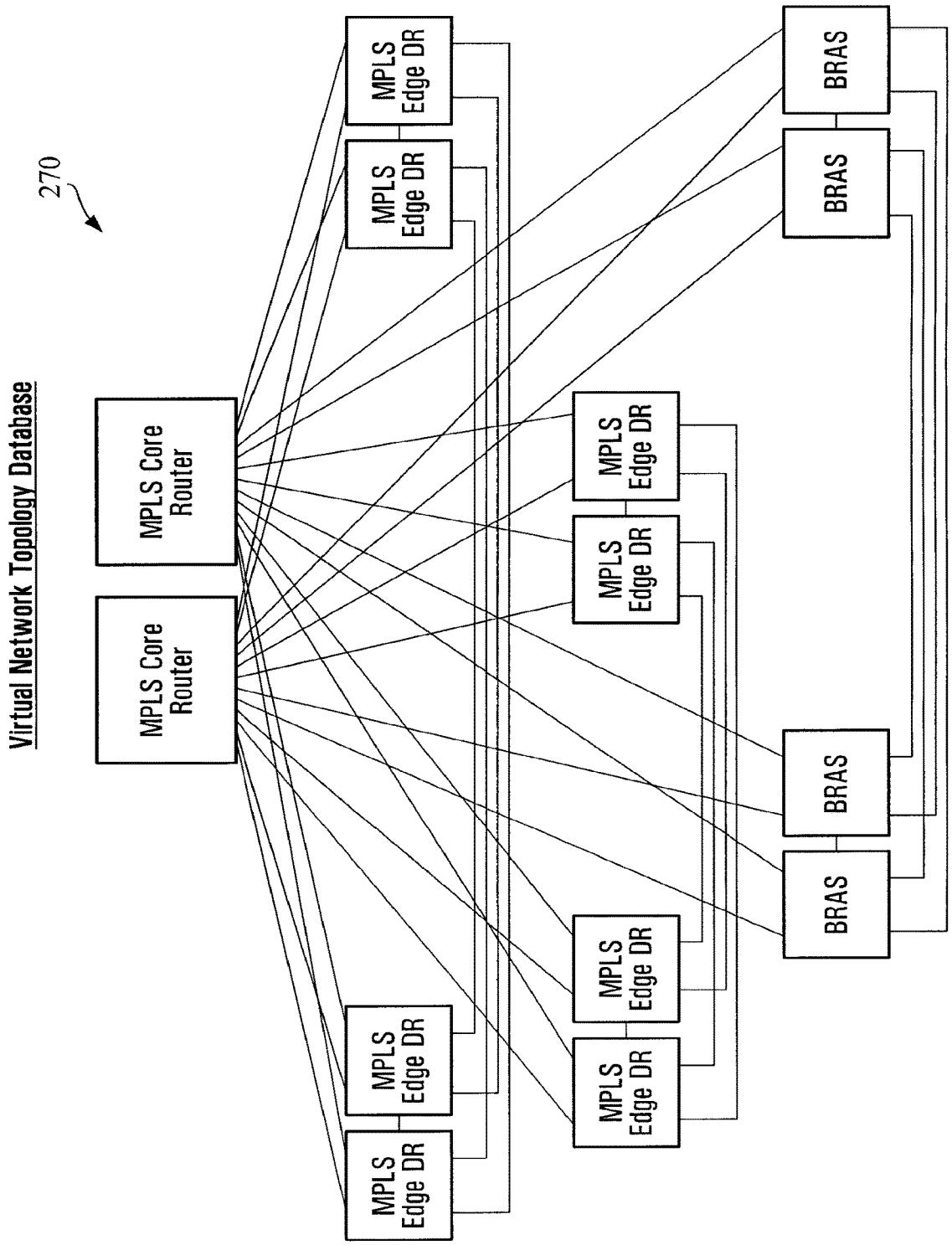
FIG. 10 is a schematic illustration of another example of contents of the virtual network topology database of the network topology computing virtual machine codes of FIG. 4.

Referring to FIG. 10, an alternative example of a representation of contents of a virtual network topology database are shown generally at 270 where virtual routers are in a "full mesh" with other virtual routers of the same type of service. More particularly, in the example of FIG. 10, four virtual MPLS edge distribution routers (each shown as "MPLS Edge DR" in FIG. 10) are in communication with each other and with two MPLS core routers, four virtual MPLS edge distribution routers (each shown as "MPLS Edge DR" in FIG. 10) are in communication with each other and with the two MPLS core routers, and four virtual broadband remote access server edge routers (each shown as "BRAS" in FIG. 10) are in communication with each other and with the two MPLS core routers.

In various embodiments, the virtual network topology creation program codes 266 shown in FIG. 4 may create various different "best fit" virtual network topologies, depending on the physical network topology represented in the physical network topology database 216, to facilitate efficient simulation of virtual router interaction. FIGS. 9 and 10 illustrate only examples of such virtual topologies in some embodiments. In some embodiments, the virtual network topology creation program codes 266 may create various different "single hierarchical tree" and "full mesh among routers of the same type of service" virtual network topologies. In some other embodiments, the virtual network topology represented in the virtual network topology database 268 may be identical to the physical network topology represented in the physical network topology database 216. In still other embodiments, the virtual network topology represented in the virtual network topology database 268 may be identical to the physical network topology represented in the physical network topology database 216 except that routers that perform only aggregations may be removed for greater simplicity. Also, in some embodiments, particular virtual edge routers in the virtual network topology represented in the virtual network topology database 268 may be separated for certain customers in order to provide added security or configurability of one or more provider edge packet forwarding interfaces for those customers.

Referring back to FIG. 2, the virtual machines implemented by the virtual machine codes in the virtual machine stores 190, 192, and 194 also direct the microprocessors 158 and 162 to implement virtual routers. For example, referring to FIGS. 2, 6, 9, and 10, the virtual machine store 190 also stores virtual router virtual machine codes 272 that, when accessed by a virtual machine implemented by virtual machine codes in the virtual machine store 190, direct the microprocessor 158 to implement a virtual router (for example, the core router 226). Likewise, virtual machine codes 274 stored in the virtual machine store 190 cause the microprocessor 158 to implement another virtual router (for example, the core router 228), virtual machine codes 278 stored in the virtual machine store 192 cause the microprocessor 158 to implement another virtual router (for example, the MPLS edge distribution router 232), virtual machine codes 280 stored in the virtual machine store 192 cause the microprocessor 158 to implement another virtual router (for example, the MPLS edge distribution router 234), virtual machine codes 282 stored in the virtual machine store 194 cause the microprocessor 162 to implement another virtual router (for example, the broadband remote access server router 236), virtual machine codes 284 stored in the virtual machine store 194 cause the microprocessor 162 to implement another virtual router (for example, the broadband remote access server router 238), and virtual machine codes 286 stored in the virtual machine store 194 cause the microprocessor 162 to implement another virtual router (for example, the broadband remote access server router 240).

Simulating interaction of the virtual routers represented in the virtual network topology database 268 shown in FIGS. 4 and 9 in the routing server chassis 118 involves receiving and responding to various routing messages that a physical router may receive. Such routing messages may include Network Layer Reachability Information ("NLRI") UPDATE messages according to the Border Gateway Protocol ("BGP") to update IP routing tables of IP routers, and such routing messages may also include Label Distribution Protocol ("LDP") messages to update forwarding tables of MPLS routers. In the embodiment shown, such messages are directed to the various virtual routers using IP addresses having the prefix 169.114.28.0/28 and are received at the communication interface 154 (shown in FIG. 2) through one or both of the switch fabrics 114 and 116 (shown in FIGS. 1 and 2) as described below.

Figure 11:
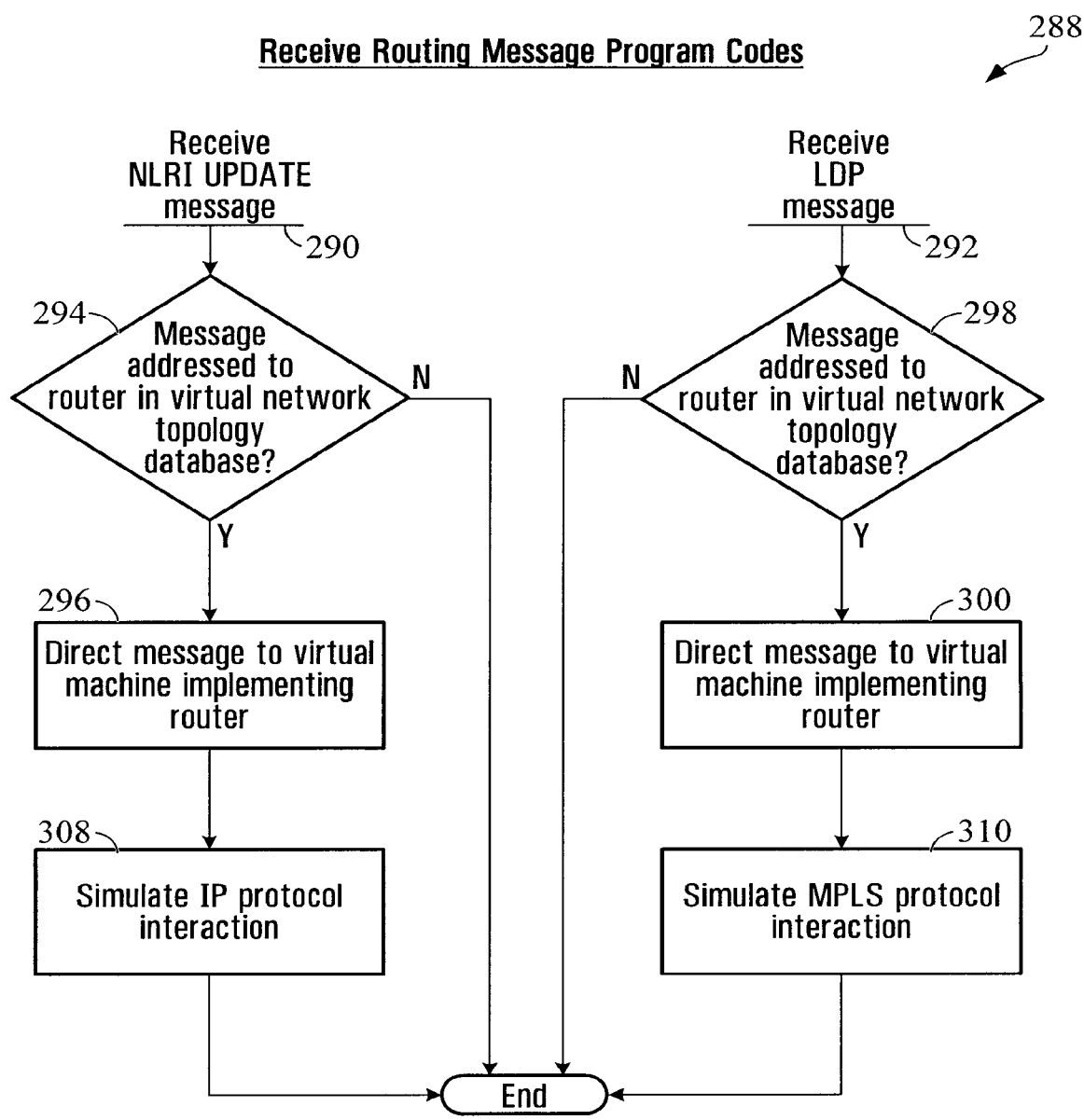
FIG. 11 is a schematic illustration of receive routing message program codes of the network topology computing virtual machine codes of FIG. 4.

Referring back to FIG. 4, the network topology computing virtual machine codes 214 include receive routing message program codes 288 including various blocks of program codes that the virtual machine implemented in the virtual machine store 196 can access to cause the microprocessor 162 to respond to receiving a routing message at the communication interface 154 (shown in FIG. 2). Referring to FIG. 11, the receive routing message program codes 288 are illustrated schematically and begin either at 290 in response to receiving an NLRI UPDATE message or at 292 in response to receiving an LDP message. Although FIG. 11 only illustrates receiving NLRI UPDATE and LDP messages, alternative embodiments may receive and respond to various other routing messages.

After an NLRI UPDATE message is received at 290, the receive routing message program codes 288 continue at block 294, which includes codes for directing the virtual machine to determine whether the NLRI UPDATE message received at 290 is directed to a virtual router represented in the virtual network topology database 268 (shown in FIGS. 4 and 9). The codes at block 294 may direct the virtual machine to determine whether a destination IP address of the NLRI UPDATE message received at 290 matches a network address in the network address field 222 of an instance of the network topology database entry 218 (shown in FIG. 5) in the virtual network topology database 268. If the NLRI UPDATE message received at 290 is not directed to a virtual router represented in the virtual network topology database 268, then the receive routing message program codes 288 end. However, if at block 294 the NLRI UPDATE message received at 290 is directed to a virtual router represented in the virtual network topology database 268, then the receive routing message program codes 288 continue at block 296, which includes codes for directing the virtual machine to direct the NLRI UPDATE message received at 290 to the virtual machine implementing the virtual router to which the NLRI UPDATE message received at 290 was addressed.

Likewise, after an LDP message is received at 292, the receive routing message program codes 288 continue at block 298, which includes codes for directing the virtual machine to determine whether the LDP message received at 292 is directed to a virtual router represented in the virtual network topology database 268 (shown in FIGS. 4 and 9). The codes at block 298 may direct the virtual machine to determine whether a destination IP address of the LDP message received at 292 matches a network address in the network address field 222 of an instance of the network topology database entry 218 (shown in FIG. 5) in the virtual network topology database 268. If the LDP message received at 292 is not directed to a virtual router represented in the virtual network topology database 268, then the receive routing message program codes 288 end. However, if at block 298 the LDP message received at 292 is directed to a virtual router represented in the virtual network topology database 268, then the receive routing message program codes 288 continue at block 300, which includes codes for directing the virtual machine to direct the LDP message received at 292 to the virtual machine implementing the virtual router to which the LDP message received at 292 was addressed.

Figure 12:
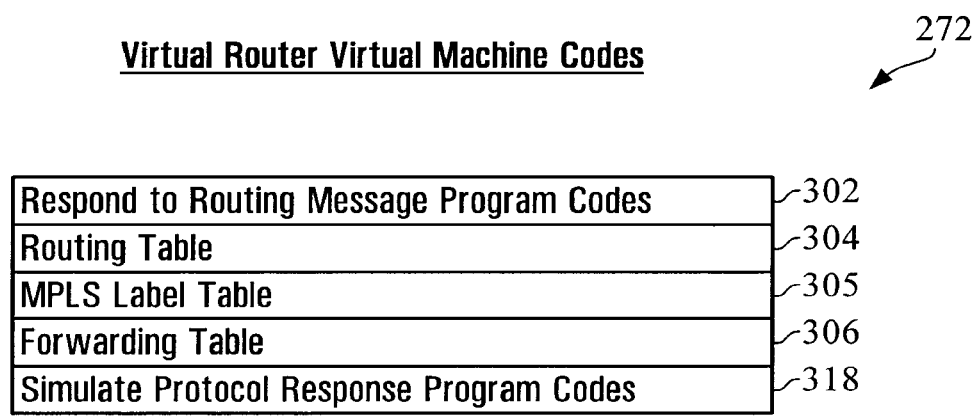
FIG. 12 is a schematic illustration of virtual router virtual machine codes of a memory of the routing server chassis of FIG. 2.

As indicated above, the various virtual machines implemented by the virtual machine codes in the virtual machine stores shown in FIG. 2 direct the various microprocessors shown in FIG. 2 to implement various virtual routers. The virtual router virtual machine codes 272, 274, 278, 280, 282, 284, and 286 all differ from each other because they direct the various microprocessors to implement different virtual routers, but the general functions of the virtual router virtual machine codes 272, 274, 278, 280, 282, 284, and 286 are similar and illustrated with reference to the virtual router virtual machine codes 272. Referring to FIG. 12, the virtual router virtual machine codes 272 include various blocks of codes, both blocks of program codes and blocks of storage codes, that the virtual machine implemented in the virtual machine store 190 can access to cause the microprocessor 158 (shown in FIG. 2) to implement a virtual router.

The virtual router virtual machine codes 272 include respond to routing message program codes 302 that the virtual machine implemented in the virtual machine store 190 can access to cause the microprocessor 158 (shown in FIG. 2) to respond to a routing message directed to the virtual machine in response to the codes in block 296 or 300 (shown in FIG. 11). In general, the respond to routing message program codes 302 direct the virtual machine to implement control plane functions of a physical router by responding to a routing message as the physical router represented by the virtual router would respond to the routing message, for example by updating one or more of a routing table 304, an MPLS label table 305, and a forwarding table 306, which are also in the virtual router virtual machine codes 272. For example, in the embodiment shown, the virtual router virtual machine codes 272 may cause the microprocessor 158 (shown in FIG. 2) to simulate exchange of virtual protocol messages (such as Open Shortest Path First ("OSPF"), Intermediate System to Intermediate System (IS-IS) protocol packets, or BGP protocol packets) with other virtual routers over virtual User Datagram Protocol ("UDP") ports of the virtual routers. Also, because the virtual routers in the embodiment shown are implemented by respective different virtual machines, the respond to routing message program codes 302 of the various different virtual machines in the embodiment shown may implement the control plane functions of the various virtual routers substantially simultaneously (or in parallel) as the virtual routers transmit and receive routing messages and exchange virtual protocol messages.

As with physical routers, the routing table 304 stores a list of routes and their next hops to particular network destinations, and may store additional information such as metrics associated with those routes. The virtual router virtual machine codes 272 may cause the microprocessor 158 (shown in FIG. 2) to modify the routing table 304 according to one or more of various routing protocols and routing algorithms that may also be implemented in a physical IP router. Such routing algorithms may include, for example, known routing algorithms such as known distance-vector routing protocols and known link-state routing protocols. Also as with physical routers, the MPLS label table 305 stores a list of incoming labels and associated instructions. For example, the MPLS label table 305 may associate a particular incoming label of an incoming frame with an instruction to "push" an additional label on the incoming frame, meaning that the incoming frame will be forwarded with the additional label. The MPLS label table 305 may also associate a particular incoming label of an incoming frame with an instruction to "swap" a different label on the incoming frame, meaning that the incoming frame will be forwarded with the different label in place of the incoming label. The MPLS label table 305 may also associate a particular incoming label of an incoming frame with an instruction to "pop" the incoming label, meaning that the incoming frame will be forwarded without the incoming label. Also as with physical routers, the forwarding table 306 stores a list of labels and associated next hops to particular network destinations, and the virtual router virtual machine codes 272 cause the microprocessor 158 to modify the MPLS label table 305 and the forwarding table 306 according to one or more of various protocols (such as LDP) that may also be implemented a physical MPLS router. Although the discussion above involves updating the routing table 304, the MPLS label table 305, and the forwarding table 306 in response to receiving a routing message at 290 or at 292, the routing table 304, the MPLS label table 305, and the forwarding table 306 may be configured or updated at other times.

The foregoing description referred to the respond to routing message program codes 302 of one virtual router, but as indicated above, the general functions of the virtual router virtual machine codes 272, 274, 278, 280, 282, 284, and 286 are similar, and in general, the various virtual machines implementing the various virtual routers update routing tables, MPLS label tables, and forwarding tables of all of the various virtual routers. As also indicated above, because the virtual routers in the embodiment shown are implemented by respective different virtual machines, the various virtual machines may update the routing tables, the MPLS label tables, and the forwarding tables of the various virtual routers substantially simultaneously (or in parallel).

When one or more of the routing tables, the MPLS label tables, and the forwarding tables of the various virtual routers are updated in response to a routing message, the WAN packet forwarding interfaces 102 and 104, the switch fabrics 114 and 116, and the provider edge packet forwarding interfaces 122, 124, and 126 (shown in FIG. 1) in the embodiment shown are configured to reflect the routing message. Therefore, referring back to FIG. 11, after block 296, the receive routing message program codes 288 continue at block 308, which includes codes for directing the virtual machine to simulate IP protocol interaction of the virtual routers represented in the virtual network topology database 268 (shown in FIGS. 4 and 9) to reflect the NLRI UPDATE message received at 290. Likewise, after block 300, the receive routing message program codes 288 continue at block 310, which includes codes for directing the virtual machine to simulate MPLS protocol interaction of the virtual routers represented in the virtual network topology database 268 (shown in FIGS. 4 and 9) to reflect the LDP message received at 292. The codes at blocks 308 and 310 direct the virtual machine implementing the network topology computing virtual machine codes 214, in response to receiving a routing message at 290 or at 292, to implement simulate protocol interaction program codes 312 in the network topology computing virtual machine codes 214. In general, the simulate protocol interaction program codes 312 include various blocks of program codes that direct a virtual machine to simulate protocol interaction.

In summary, when one or more of the routing tables, the MPLS label tables, and the forwarding tables of the various virtual routers are updated in response to a routing message, the simulate protocol interaction program codes 312 direct the virtual machine to:
1. identify a hypothetical packet representing packets affected by the routing message;
2. identify a "next hop" that the hypothetical packet would take as the hypothetical packet exits the virtual routers in the virtual network topology database 268;
3. identify any changes to the hypothetical packet (such as changes to MPLS headers of the packet) as the hypothetical packet is routed through the virtual routers in the virtual network topology database 268; and
4. configure the WAN packet forwarding interfaces 102 and 104, the switch fabrics 114 and 116, and the provider edge packet forwarding interfaces 122, 124, and 126 (shown in FIG. 1) to
   a. direct packets affected by the routing message to the "next hop" identified as described above, and
   b. change packets affected by the routing message as described above.

Figure 13:
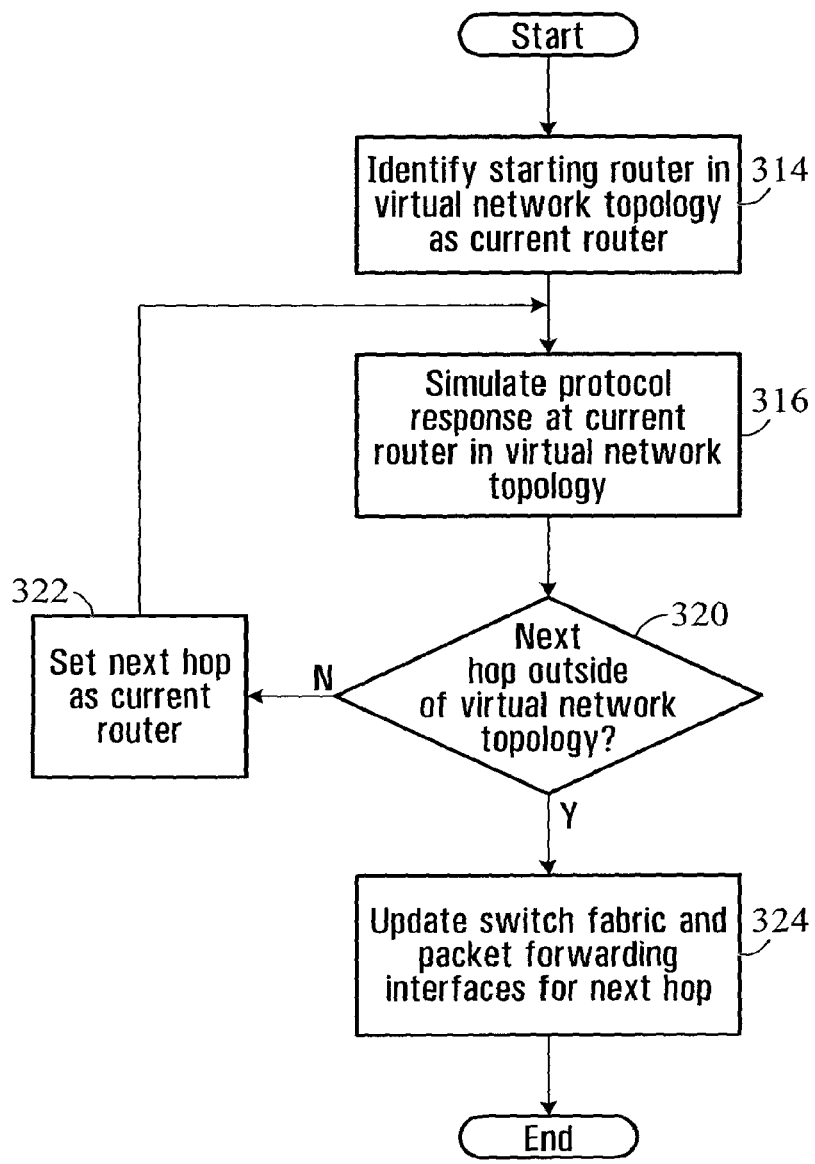
FIG. 13 is a schematic illustration of simulate protocol interaction program codes of the network topology computing virtual machine codes of FIG. 4.

Referring to FIG. 13, the simulate protocol interaction program codes 312 are illustrated schematically and begin at block 314, which includes codes for directing the virtual machine to identify a starting router in the virtual network topology database 268 (shown in FIGS. 4 and 9). The router identified at block 314 may be any virtual router (such as the core router 226, for example). As described below, the simulate protocol interaction program codes 312 iterate through one or more virtual routers in the virtual network topology database 268, and each stage of such iteration involves simulating a response of a "current" router in the virtual network topology database 268. Therefore, the codes at block 314 set the starting router as the current router, and various blocks of code may change the current router as described below.

The simulate protocol interaction program codes 312 continue at block 316, which includes codes for directing the virtual machine to simulate a response of the current router in the virtual network topology database 268 to a hypothetical packet. The hypothetical packet reflects the information received in the routing message received at 290 or 292. For example, if the routing message indicated routing information for IP addresses having a 24-bit prefix 169.114.72.0/24, namely IP addresses ranging from 169.114.72.0 to 169.114.72.255, then the hypothetical packet would start at the starting router and travel through the virtual routers represented in the virtual network topology database 268 according to responses of the various virtual routers to IP packets addressed to IP addresses having the prefix 169.114.72.0/24. As another example, if the routing message indicated routing information for the 20-bit MPLS label 10011100101110100110, then the hypothetical packet would start at the starting router and travel through the virtual routers represented in the virtual network topology database 268 according to responses of the various virtual routers to packets having that MPLS label.

Referring back to FIG. 12, the virtual router virtual machine codes 272 also include simulate protocol response program codes 318, which direct the virtual machine implementing a particular virtual router to simulate the response of the virtual router to the hypothetical packet and identify a "next hop" for the hypothetical packet. Simulating the response of the virtual router to the hypothetical packet may also identify a change in labels if the hypothetical packet is an MPLS packet, for example adding a new MPLS label to the MPLS packet or removing an existing MPLS label from the MPLS packet. Simulating the response of the virtual router to the hypothetical packet may also identify a packet processing command related to, for example, a firewalling feature, a quality of service ("QoS") feature, packet multicasting replications, or packet filtering features such as access lists.

Referring back to FIG. 13, the simulate protocol interaction program codes 312 continue at block 320, which includes codes for directing the virtual machine to determine whether the "next hop" identified at block 316 is outside of the virtual routers represented in the virtual network topology database 268. The codes at block 320 may direct the virtual machine to determine whether an IP address of the "next hop" identified at block 316 matches a network address in the network address field 222 of an instance of the network topology database entry 218 (shown in FIG. 5) in the virtual network topology database 268. If at block 320 the "next hop" identified at block 316 is one of the virtual routers represented in the virtual network topology database 268, then the simulate protocol interaction program codes 312 continue at block 322, which includes codes for directing the virtual machine to change the current router to the "next hop" identified at block 316, and the simulate protocol interaction program codes 312 then return to block 316 as described above. Therefore, the simulate protocol interaction program codes 312 simulate the route of the hypothetical packet through the virtual routers represented in the virtual network topology database 268 until the "next hop" of the hypothetical packet from one of the virtual routers represented in the virtual network topology database 268 is outside of the virtual routers represented in the virtual network topology database 268.

If at block 320 the "next hop" identified at block 316 is outside of the virtual routers represented in the virtual network topology database 268, then the simulate protocol interaction program codes 312 continue at block 324, which includes codes for directing the virtual machine to configure the WAN packet forwarding interfaces 102 and 104, the switch fabrics 114 and 116, and the provider edge packet forwarding interfaces 122, 124, and 126 (shown in FIG. 1) to implement any packet processing commands (related to, for example, a firewalling feature, a QoS feature, packet multicasting replications, or packet filtering features such as access lists) and otherwise forward packets represented by the hypothetical packet (that is, packets having the network address or label of the hypothetical packet, or packets having a network address in a range of network addresses represented by the hypothetical packet) to the "next hop" that was identified at block 316 outside of the virtual routers represented in the virtual network topology database 268. The codes at block 324 may, for example, direct the virtual machine to transmit configuration messages to the WAN packet forwarding interfaces 102 and 104, the switch fabrics 114 and 116, and the provider edge packet forwarding interfaces 122, 124, and 126. Such configuration messages may, for example, be software-defined networking ("SDN") messages based on an OpenFlow application programming interface ("API"), may follow other open standards, or may follow a proprietary API.

Although the discussion above involves executing the simulate protocol interaction program codes 312 in response to the codes at blocks 308 and 310 (shown in FIG. 12), the simulate protocol interaction program codes 312 may be executed at other times to configure the WAN packet forwarding interfaces 102 and 104, the switch fabrics 114 and 116, and the provider edge packet forwarding interfaces 122, 124, and 126. For example, when the system 100 (shown in FIG. 1) is first set up, it may be necessary to simulate protocol interaction for numerous hypothetical packets to initialize the WAN packet forwarding interfaces 102 and 104, the switch fabrics 114 and 116, and the provider edge packet forwarding interfaces 122, 124, and 126.

Figure 14:
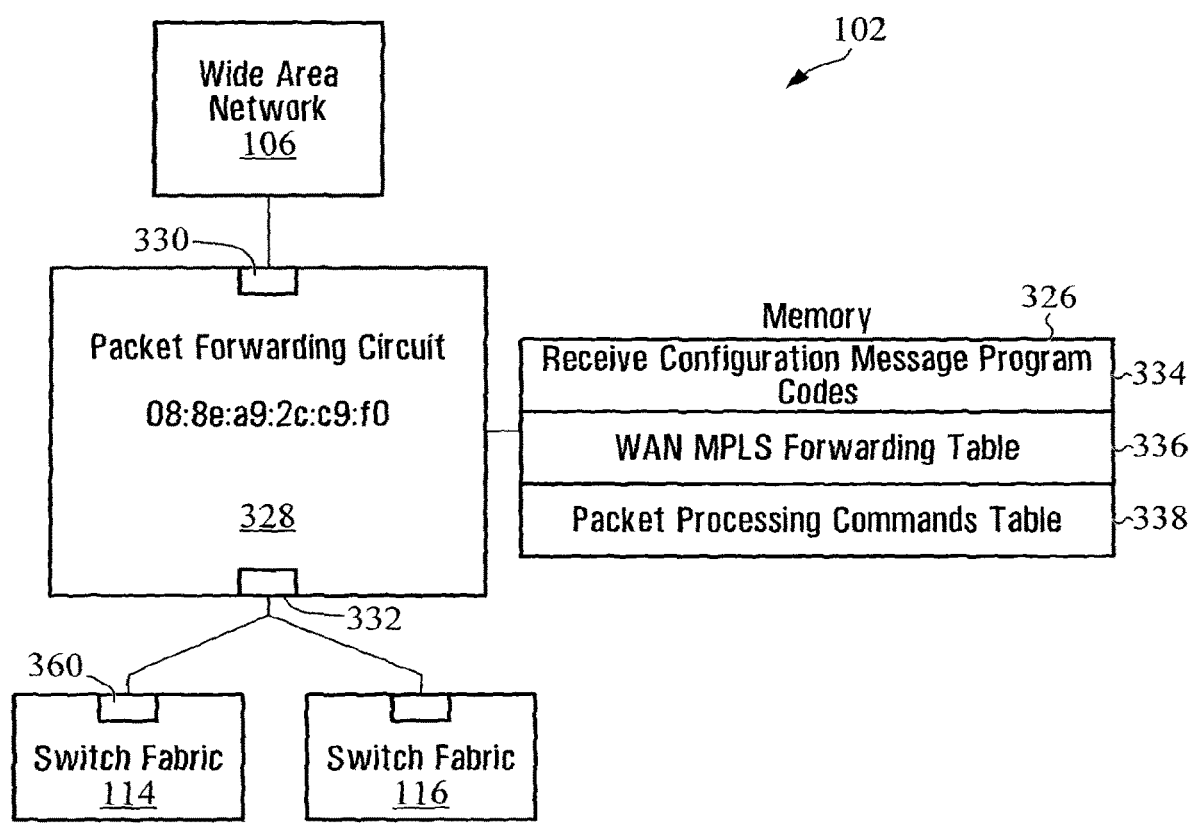
FIG. 14 is a schematic illustration of a wide area network ("WAN") packet forwarding interface of the system of FIG. 1.

Referring to FIG. 14, the WAN packet forwarding interface 102 is illustrated schematically and includes a memory 326, which may be implemented on one or more of the same or different computer-readable storage media, which in various embodiments may include one or more of a random access memory ("RAM"), a hard disc drive ("HDD"), and other computer-readable and computer-writable storage media for example. The WAN packet forwarding interface 102 also includes a packet forwarding circuit 328 in communication with the memory 326. The packet forwarding circuit 328 includes a communication interface 330 in communication with the WAN 106, and a communication interface 332 in communication with the switch fabrics 114 and 116. The communication interface 332 in the embodiment shown is a network port having a 48-bit media access control ("MAC") address 08:8e:a9:2c:c9:f0 in hexadecimal notation. The packet forwarding circuit 328 may be an application specific integrated circuit ("ASIC"), and the WAN packet forwarding interface 102 may be implemented in a one-rack-unit ("1RU") or two-rack-unit ("2RU") stackable blade. Although only one such blade is shown in FIG. 14, a WAN packet forwarding interface according to an alternative embodiment may include a stack of such blades functioning together as a WAN packet forwarding block.

The memory 326 stores receive configuration message program codes 334, which include various program codes that may be executed by the packet forwarding circuit 328 when the packet forwarding circuit 328 receives a configuration message in response to the codes at block 324 (shown in FIG. 13). The receive configuration message program codes 334 direct the packet forwarding circuit 328 to configure one or both of a WAN packet forwarding table 336 and a packet processing commands table 338 in the memory 326 in response to such configuration messages.

The packet forwarding circuit 328 also forwards packets received at the communication interface 330 to the communication interface 332, and forwards packets received at the communication interface 332 to the communication interface 330, according to the WAN packet forwarding table 336 and the packet processing commands table 338 as described below. For example, the packet processing commands table 338 may direct the packet forwarding circuit 328 to implement a firewalling feature, a QoS feature, packet multicasting replications, or packet filtering features such as access lists, for example. The WAN packet forwarding interface 104 is substantially the same as the WAN packet forwarding interface 102, except that the communication interface of the WAN packet forwarding interface 104 in communication with the switch fabrics 114 and 116 has a MAC address 08:8e:a9:16:de:f6 as shown in FIG. 1.

Figure 15:
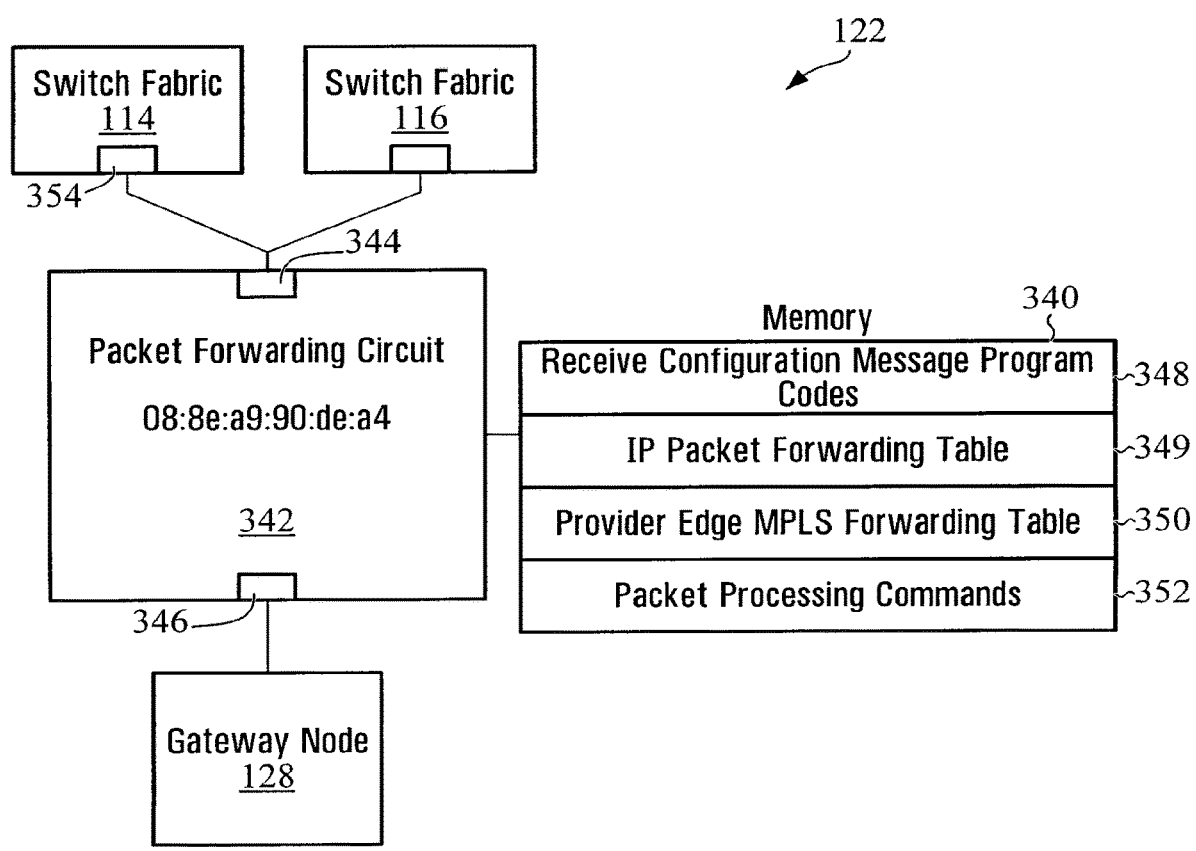
FIG. 15 is a schematic illustration of a provider edge packet forwarding interface of the system of FIG. 1.

Referring to FIG. 15, the provider edge packet forwarding interface 122 is illustrated schematically and includes a memory 340, which may be implemented on one or more of the same or different computer-readable storage media, which in various embodiments may include one or more of a random access memory ("RAM"), a hard disc drive ("HDD"), and other computer-readable and computer-writable storage media for example. The provider edge packet forwarding interface 122 also includes a packet forwarding circuit 342 in communication with the memory 340. The packet forwarding circuit 342 includes a communication interface 344 in communication with the switch fabrics 114 and 116, and a communication interface 346 in communication with the gateway node 128. The communication interface 344 in the embodiment shown is a network port having a MAC address 08:8e:a9:90:de:a4 in hexadecimal notation. The packet forwarding circuit 342 may also be an ASIC, and the provider edge packet forwarding interface 122 may also be implemented in a 1RU or 2RU stackable blade, for example. Although only one such blade is shown in FIG. 15, a provider edge packet forwarding interface according to an alternative embodiment may include a stack of such blades functioning together as a provider edge packet forwarding block.

The memory 340 stores receive configuration message program codes 348, which include various program codes that may be executed by the packet forwarding circuit 342 when the packet forwarding circuit 342 receives a configuration message in response to the codes at block 324 (shown in FIG. 13). The receive configuration message program codes 348 direct the packet forwarding circuit 342 to configure one or more of an IP packet forwarding table 349, an MPLS provider edge packet forwarding table 350, and a packet processing commands table 352 in the memory 340 in response to such configuration messages.

The packet forwarding circuit 342 also forwards packets received at the communication interface 344 to the communication interface 346, and forwards packets received at the communication interface 346 to the communication interface 344, according to one or more of the IP packet forwarding table 349, the MPLS provider edge packet forwarding table 350, and the packet processing commands table 352 as described below. For example, the packet processing commands table 352 may direct the packet forwarding circuit 342 to implement a firewalling feature, a QoS feature, packet multicasting replications, or packet filtering features such as access lists, for example. The provider edge packet forwarding interfaces 124 and 126 are substantially the same as the provider edge packet forwarding interface 122, except that the communication interface of the provider edge packet forwarding interface 124 in communication with the switch fabrics 114 and 116 has a MAC address 08:8e:a9:16:2f:a4 and the communication interface of the provider edge packet forwarding interface 126 in communication with the switch fabrics 114 and 116 has a MAC address 08:8e:a9:f7:2e:82 as shown in FIG. 1.

Figure 16:
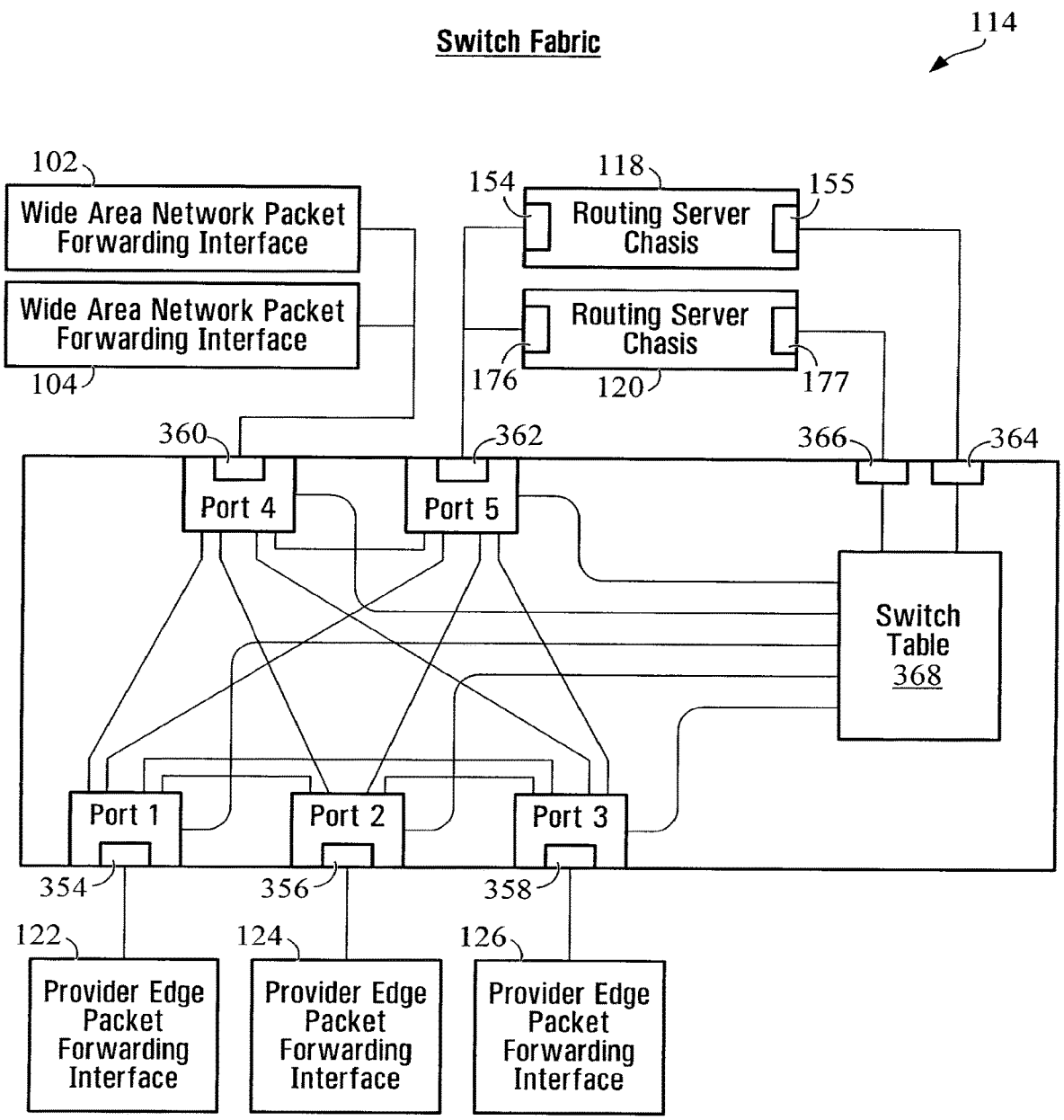
FIG. 16 is a schematic illustration of a switch fabric of the system of FIG. 1.

Referring to FIG. 16, the switch fabric 114 is illustrated schematically and includes five communication ports, namely Port 1 having a communication interface 354 in communication with the provider edge packet forwarding interface 122, Port 2 having a communication interface 356 in communication with the provider edge packet forwarding interface 124, Port 3 having a communication interface 358 in communication with the provider edge packet forwarding interface 126, Port 4 having a communication interface 360 in communication with the WAN packet forwarding interfaces 102 and 104, and Port 5 having a communication interface 362 in communication with the communication interface 154 of the routing server chassis 118 and with the communication interface 176 of the routing server chassis 120.

The switch fabric 114 also includes a communication interface 364 in communication with the communication interface 155 of the routing server chassis 118, and a communication interface 366 in communication with the communication interface 177 of the routing server chassis 120. The communication interfaces 364 and 366 facilitate communications between the routing server chassis 118 and 120 and an MPLS switch table 368 stored in at least one memory in the switch fabric 114 and in communication with the five ports of the switch fabric 114. In alternative embodiments, the communication interfaces 155, 177, 364, and 366 may be omitted, and in such embodiments the routing server chassis 118 and 120 may configure the MPLS switch table 368 by sending configuration messages to the MPLS switch table 368 through other ports of the one or both of the switch fabrics 114 and 116.

Each of the five ports of the switch fabric 114 is connected to each other port of the switch fabric 114 in order to provide non-blocking any-to-any communication between any two of the ports of the switch fabric 114. Therefore, each port of the switch fabric 114 is configured to queue data and synchronize connections with each other port of the switch fabric 114 as may be required to avoid collisions from other ports of the switch fabric 114 when communicating with a particular other port of the switch fabric 114. Further, the ports of the switch fabric 114 are configured to connect to a particular other port of the switch fabric 114 according to the MPLS switch table 368 as described below. Each of the five ports of the switch fabric 114 may have speeds of 40-gigabit-per-second Ethernet ("40GE"), 100-gigabit-per-second Ethernet ("100GE"), 400-gigabit-per-second Ethernet ("400GE"), or 1000-gigabit-per-second Ethernet ("1000GE"), for example. The switch fabric 116 is substantially the same as the switch fabric 114.

Although each of the switch fabrics 114 and 116 has only five ports, switch fabrics in alternative embodiments may include fewer or more ports, and in some embodiments may include significantly more ports to facilitate communication with a large number of networks. Also, although each of the switch fabrics 114 and 116 is shown as a single device, a switch fabric in alternative embodiments may include a plurality of interconnected devices, such as multi-chassis switch fabrics, for example, to produce a larger effective switch fabric as may be desired in some embodiments.

In general, the configuration messages generated at block 324 (shown in FIG. 13) may configure one or both of the WAN packet forwarding table 336 and the packet processing commands table 338 of the WAN packet forwarding interface 102, one or both of a WAN packet forwarding table and a packet processing commands table of the WAN packet forwarding interface 104, the MPLS switch table 368 of the switch fabric 114, an MPLS switch table of the switch fabric 116, one or more of the IP packet forwarding table 349, the MPLS provider edge packet forwarding table 350, and the packet processing commands table 352 of the provider edge packet forwarding interface 122, and one or more of an IP packet forwarding table, a provider edge packet forwarding table, and a packet processing commands table of each of the provider edge packet forwarding interfaces 124 and 126 to cause the WAN packet forwarding interfaces 102 and 104, the switch fabrics 114 and 116, and the provider edge packet forwarding interfaces 122, 124, and 126 to forward packets as the physical routers in the physical network topology database 216 (shown in FIGS. 4 and 6) would forward packets.

An example of the IP packet forwarding table 349 (also shown in FIG. 15) is illustrated in FIG. 17. As indicated above, in the physical network shown in FIG. 6, the MPLS edge distribution router 232 functions as a label edge router to push MPLS labels into packets destined to the core routers 226 and 228. Therefore, when the provider edge packet forwarding interface 122 receives an IP packet (such as in a frame including an IP packet shown at 242 in FIG. 7, for example) from the gateway node 128 at the communication interface 346 (shown in FIG. 15), the provider edge packet forwarding interface 122 identifies a label to push onto the packet so that the packet can proceed as if it had passed through the MPLS edge distribution router 232. Also, when the provider edge packet forwarding interface 122 receives a frame including an IP packet (such as shown at 242 in FIG. 7, for example) from the gateway node 128 at the communication interface 346 (shown in FIG. 15), the provider edge packet forwarding interface 122 identifies a physical address for the next hop in the WAN 106 so that the provider edge packet forwarding interface 122 can produce a frame including an MPLS packet (such as shown at 252 in FIG. 8, for example) with the label for the MPLS packet and the physical address of the next hop in the WAN 106.

Therefore, referring to FIG. 17, the example IP packet forwarding table 349 includes various entries such as entries 370, 372, 374, and 376 shown as rows in FIG. 17. Each such entry includes a network destination address field, shown as column 378, for storing a network address or a network address prefix, a mask field, shown in column 380, for storing a bit mask to indicate the significant bits of the network address or network address prefix in the respective network destination address field 378 of the entry, a next hop physical address field, shown in column 382, for storing a next hop physical address for incoming IP packets directed to an IP address having bits that match the bits, indicated by the bits in the respective mask field 380 of the entry, of the network address or network address prefix in the respective network destination address field 378 of the entry, and a label field, shown in column 384, for storing one or more labels to be added to incoming IP packets directed to an IP address having bits that match the bits, indicated by the bits in the respective mask field 380 of the entry, of the network address or network address prefix in the respective network destination address field 378 of the entry.

In general, when the packet forwarding circuit 342 receives a frame including an IP packet (such as shown at 242 in FIG. 7, for example) from the gateway node 128 at the communication interface 346 (shown in FIG. 15), the packet forwarding circuit 342 iterates through entries of the IP packet forwarding table 349, beginning with the first entry 370. At each such entry, the packet forwarding circuit 342 generates a logical "bitwise and" of the destination address in the destination IP address field 250 (shown in FIG. 7) of the incoming IP packet and the mask of the entry in the IP packet forwarding table 349. If the result of the "bitwise and" matches the network address or network address prefix in the network destination address field of the entry, then the entry matches the destination address in the destination IP address field 250 of the incoming IP packet.

Once the packet forwarding circuit 342 matches an entry in the IP packet forwarding table 349 to the destination IP address field 250 of the incoming IP packet, the packet forwarding circuit 342 generates an outgoing frame including an MPLS packet (such as shown at 252 in FIG. 8, for example) in which the frame header 254 (shown in FIG. 8) stores the next hop physical address of the matching entry in the IP packet forwarding table 349, and the label field 262 stores the label of the matching entry in the IP packet forwarding table 349. The remaining fields in the IP packet may remain unchanged, except for some minor updates such as, for example, an update of the time to live field in the IP packet header.

For example, the entry 370 in the IP packet forwarding table 349 includes a network destination address 169.114.72.15 associated with a mask 255.255.255.255, and a destination address of an incoming IP packet will only match that entry if the destination address is exactly 169.114.72.15. As another example, the entry 372 in the IP packet forwarding table 349 includes a network destination address 169.114.28.0 associated with a mask 255.255.255.240 having 1s in the first 28 bits, and a destination address of an incoming IP packet will match that entry if the first 28 bits of the destination match 169.114.28.0, that is, if the destination address of the incoming IP packet is between 169.114.28.0 and 169.114.28.15 inclusive. If the destination address of the incoming IP packet does not match any other entry in the IP packet forwarding table 349, then the destination address will match the last entry 376, which includes a network destination address 0.0.0.0 associated with a mask 0.0.0.0, because the mask 0.0.0.0 ensures that the entry 376 will match any destination address of an incoming IP packet.

Alternatively, if the provider edge packet forwarding interface 122 receives a frame including an MPLS packet (such as shown at 252 in FIG. 8, for example) from one or both of the switch fabrics 114 and 116 at the communication interface 344 (shown in FIG. 15), then the provider edge packet forwarding interface 122 determines whether to make any changes to the label or labels of the frame before forwarding the packet to the gateway node 128 at the communication interface 346 (also shown in FIG. 15). Likewise, if the provider edge packet forwarding interface 122 receives a frame including an MPLS packet from the gateway node 128 at the communication interface 346, then the provider edge packet forwarding interface 122 determines whether to make any changes to the label or labels of the frame before forwarding the packet to the switch fabrics 114 and 116 at the communication interface 344. Therefore, if the provider edge packet forwarding interface 122 receives a frame including an MPLS packet, the packet forwarding circuit 342 searches the MPLS provider edge packet forwarding table 350 for an entry matching the labels of the incoming MPLS packet.

Referring to FIG. 18, an example of the MPLS provider edge packet forwarding table 350 is shown and includes various entries such as entries 386, 388, and 390 shown as rows in FIG. 18. Each such entry includes an incoming label field, shown as column 392, for storing an MPLS label value for example, a next hop physical address field, shown in column 394, for storing a next hop physical address for incoming MPLS packets having MPLS labels matching the label value in the incoming label field 392 of the entry, an instructions field, shown in column 396, for storing one or more instructions regarding the labels of the incoming MPLS packets having MPLS labels matching the label value in the incoming label field 392 of the entry, and an outgoing labels field, shown in column 398, for storing one or more labels to be added to outgoing MPLS packets if the instruction or instructions in the respective instructions field 396 indicate adding an MPLS label. The labels illustrated in the example of FIG. 18 include only six bits for simplicity, but the labels in various embodiments may include, for example, 20-bit MPLS labels or other labels.

For example, the entry 386 in the MPLS provider edge packet forwarding table 350 indicates that a particular incoming label should be swapped for a particular outgoing label. In other words, by causing the entry 386 to be stored in the MPLS provider edge packet forwarding table 350, the routing server chassis 118 associates an instruction with a label on the memory 340 according to at least one outcome of the simulated interaction of the plurality of virtual network routers in the routing server chassis 118, and the instruction causes the provider edge packet forwarding interface 122 to modify a label in a frame by swapping an incoming label for an outgoing label. As other examples, the entry 388 in the MPLS provider edge packet forwarding table 350 indicates that a particular incoming label should be popped or removed from the outgoing packet, and the entry 390 in the MPLS provider edge packet forwarding table 350 indicates that for particular incoming label, an additional outgoing label should be pushed onto the outgoing packet.

Referring back to FIG. 16, particular ports of the switch fabric 114 receive frames from the WAN packet forwarding interfaces 102 and 104, the switch fabrics 114 and 116, the routing server chassis 118 and 120, and the provider edge packet forwarding interfaces 122, 124, and 126. The ports of the switch fabric 114 identify an MPLS label in such frames, and search the MPLS switch table 368 to determine where to transmit such frames according to their MPLS labels. Referring to FIG. 19, an example of the MPLS switch table 368 is shown and includes various entries such as entries 400, 402, and 404 shown as rows in FIG. 19. Each such entry includes a label field, shown as column 406, for storing an MPLS label value, and a switch field, shown as column 408, for indicating one or more ports to which a frame should be directed if the frame has a label matching the label value in the label field 406 of the entry. Therefore, entries in the MPLS switch table 368 store representations of at least one label and at least one destination network or IP address in association with respective ports of the switch fabric 114, and when the routing server chassis 118 directs the communication interface 155 to configure the MPLS switch table 368, the routing server chassis 118 configures the routing server chassis 118 to direct network packets according to labels, and more particularly MPLS labels, of the network packets.

For example, referring to FIGS. 1, 16, 17, and 19, if the provider edge packet forwarding interface 124 receives an IP packet addressed to a destination address 169.115.32.108, the provider edge packet forwarding interface 124 will match the destination address of the incoming IP packet to the entry 374 in the IP packet forwarding table 349 and transmit an outgoing frame including an MPLS packet (such as shown at 252 in FIG. 8, for example) with the label 101001 . . . (an abbreviation of a 20-bit MPLS label) in the label field 262 of the MPLS packet and the destination physical address 48:d3:e7:62:dc:19 in the frame header 254 of the MPLS packet. Accordingly, the provider edge packet forwarding interface 124 modifies the frame, and more particularly the destination physical address of the frame, according to the IP packet forwarding table 349 as configured by the routing server chassis 118 according to at least one outcome of the simulated interaction of the plurality of virtual network routers in the routing server chassis 118. Also, the provider edge packet forwarding interface 124 adds a label according to an association between the label and a destination network or IP address in the IP packet forwarding table 349 as configured by the routing server chassis 118, and therefore according to at least one outcome of the simulated interaction of the plurality of virtual network routers in the routing server chassis 118. The provider edge packet forwarding interface 124 will transmit the outgoing frame to the switch fabrics 114 and 116, which will direct the frame to port 4 because the label 101001 . . . matches the entry 402 in the MPLS switch table 368. Port 4 of the switch fabrics 114 and 116 will direct the frame to the WAN packet forwarding interfaces 102 and 104, which then direct the frame to the WAN 106. The WAN 106 directs the frame according to its physical address 48:d3:e7:62:dc:19 to the core Internet router 108 as shown in FIG. 1.

As another example, referring to FIGS. 1, 16, 18, and 19, if the WAN packet forwarding interface 104 receives a frame including an MPLS packet from the WAN 106 with a label 110011 . . . , then the WAN packet forwarding interface 104 forwards the frame to the switch fabrics 114 and 116, which will direct the frame to port 3 because the label 110011 . . . matches the entry 404 in the MPLS switch table 368. Port 3 of the switch fabrics 114 and 116 will direct the frame to the provider edge packet forwarding interface 126, which will pop the label 110011 . . . from the frame because the label 110011 . . . matches the entry 388 in the MPLS provider edge packet forwarding table 350. The provider edge packet forwarding interface 126 will therefore forward a frame without a label, or a frame including an IP packet shown at 242 in FIG. 7, to the gateway node 132, which will then direct the IP packet to one of the hosts 144 according to the destination IP address of the IP packet.

As another example, and still referring to FIGS. 1, 16, 18, and 19, if the routing server chassis 118 transmits a frame including an MPLS packet to the switch fabrics 114 and 116 with a label 101101 . . . , a destination network address 169.114.72.15 and a destination physical address 08:8e:a9:90:de:a4, then the frame will reach the provider edge packet forwarding interface 122 because the label 101101 . . . matches the entry 400 in the MPLS switch table 368, which directs the switch fabrics 114 and 116 to forward the frame to Port 1. In that manner, the routing server chassis 118 and 120 can send configuration messages (such as OpenFlow SDN messages) to the WAN packet forwarding interfaces 102 and 104, the switch fabrics 114 and 116, and the provider edge packet forwarding interfaces 122, 124, and 126 to configure the WAN packet forwarding interfaces 102 and 104, the switch fabrics 114 and 116, and the provider edge packet forwarding interfaces 122, 124, and 126 as described above.

As another example, referring to FIGS. 1, 2, and 14, the virtual router simulating the MPLS core router 226 or 228 may exchange routing protocol packets (such as OSPF or Intermediate System to Intermediate System (IS-IS) protocol packets or LDP protocol packets) through the WAN 106 to another WAN core router (whether physical or virtual) in a geographically different PoP. Following such protocol exchanges, the local virtual WAN core router may associate MPLS labels with particular IP prefixes of other networks. The WAN packet forwarding table 336 may store such labelling information and detailed forwarding entries (such as what Ethernet or High-Level Data Link Control ("HDLC") header to use, and which WAN interfaces to use in embodiments including a plurality of physical WAN interfaces of the virtual PoP). When an IP packet enters the virtual PoP through a provider edge packet forwarding interface 122, 124, or 126 and is destined for another PoP in a different geographical location, the packet may be switched through the switch fabrics 114 and 116 and arrive at the WAN packet forwarding interface 102. The WAN packet forwarding table 336 may be used to determine which WAN interface to use to send the packet, and to look up what MPLS label to add to the packet. The WAN packet forwarding interface 102 can then add a WAN protocol layer two (data link layer) header depending the type of WAN interface. For example, the packet forwarding interface 102 can add an Ethernet header if the WAN interface is a 10-gigabit-per-second Ethernet ("10GE"), an HDLC header, or a Synchronous Optical Network/Synchronous Digital Hierarchy ("SONET/SDH") header if the WAN interface is a Packet Over SONET ("POS") interface, and the WAN packet forwarding interface 102 can then forward the packet out of the WAN interface as a physical packet.

In other words, each port of the switch fabric 114 can carry either configuration data to a respective packet forwarding interface in communication with the port, or customer data to a network in communication with the respective packet forwarding interface. However, in alternative embodiments, configuration data may be transmitted to the packet forwarding interfaces through separate ports instead of through the switch fabrics.

In summary, the switch fabrics 114 and 116 may be referred to as "at least one switch" operable to communicate with a plurality of computers, namely the hosts 136, 140, and 144 and the core Internet routers 108, 110, and 112 in the in the embodiment of FIG. 1. Further, in the embodiment of FIG. 1, the routing server chassis 118 functions as at least one processor circuit that simulates interaction of a plurality of virtual network routers (shown in FIG. 9 in the embodiment of FIG. 1) and directs the communication interface 155 to configure the switch fabrics 114 and 116 to direct communication to at least one of the plurality of computers according to at least one outcome of the simulated interaction of the plurality of virtual network routers. In the embodiment of FIG. 1, the routing server chassis 118 also configures a plurality of packet forwarding interfaces (102, 104, 122, 124, and 126 in the embodiment of FIG. 1) to facilitate communication between the plurality of computers according to the at least one outcome of the simulated interaction of the plurality of virtual network routers.

Referring back to FIG. 1, the system 100 generally includes various redundant components for fault tolerance.

For example, the system 100 could function with a single WAN packet forwarding interface 102, and the additional WAN packet forwarding interface 104 can provide backup functions if the WAN packet forwarding interface 102 fails for some reason. Alternative embodiments may include additional WAN packet forwarding interfaces for greater fault tolerance. Likewise, the system 100 could function with a single switch fabric 114, and the additional switch fabric 116 can provide backup functions if the switch fabric 116 fails for some reason. Alternative embodiments may include additional switch fabrics for greater fault tolerance. Also, although the system 100 could function with a single routing server chassis 118, the routing server chassis 120 can provide backup functions if the routing server chassis 118 fails for some reason. Alternative embodiments may include additional routing server chassis for greater fault tolerance.

Referring back to FIGS. 2 and 3, the virtual machine stores 202, 204, 206, and 208 implement the same functions as the virtual machine stores 190, 192, 194, and 196 respectively. More particularly, the virtual machine store 202 stores virtual router virtual machine codes (not shown) that implement the same functions as the virtual router virtual machine codes 272 and 274, the virtual machine store 204 stores virtual router virtual machine codes (not shown) that implement the same functions as the virtual router virtual machine codes 278 and 280, the virtual machine store 206 stores virtual router virtual machine codes (not shown) that implement the same functions as the virtual router virtual machine codes 282, 284, and 286, and the virtual machine store 208 stores network topology computing virtual machine codes (not shown) that implement the same functions as the network topology computing virtual machine codes 214. Therefore, for example, as routing messages directed to the various virtual routers (using IP addresses having the prefix 169.114.28.0/28 in the example of FIG. 1) are received at the communication interface 154, such routing messages are also received at the communication interface 176 in order to update the virtual routers implemented by the virtual machines in the virtual machine stores 202, 204, and 206 using the network topology computing program implemented by the virtual machine in the virtual machine store 208.

If an active virtual router implemented in a virtual machine on the routing server chassis 118 fails for some reason, then a corresponding redundant (or "hot standby") virtual router implemented in a virtual machine on the routing server chassis 120 may continue to function in place of the failed virtual router. Likewise, if the active network topology computing program implemented in a virtual machine on the routing server chassis 118 fails for some reason, then a corresponding redundant (or "hot standby") network topology computing program implemented in a virtual machine on the routing server chassis 120 may continue to function in place of the failed network topology computing program. Further, if an active virtual machine on the routing server chassis 118 fails for some reason, then a corresponding redundant (or "hot standby") virtual machine on the routing server chassis 120 may continue to function in place of the failed virtual router. Still further, if the active routing server chassis 118 fails for some reason, then the routing server chassis 120 may continue to function in place of the failed server blade. In some embodiments, a virtual machine on the routing server chassis 120 may resume one or more functions the routing server chassis 118 in about 50 milliseconds, although a routing server chassis in alternative embodiments may resume failed functions in more or less time.

As such, the routing server chassis 120 is a redundant "hot standby" to the routing server chassis 118. Herein, "redundant" and "hot standby" may refer to a program (such as a virtual router program or a network topology computing program as described above), a virtual machine, or a chassis that duplicates another program, virtual machine, or chassis sufficiently closely such that the redundant program, virtual machine, or chassis can resume functions of the other program, virtual machine, or chassis relatively quickly, such as within 50 milliseconds for example. Therefore, the routing server chassis 120 and the programs and virtual machines thereon may not exactly duplicate the routing server chassis 118 and the programs and virtual machines thereon, but the routing server chassis 120 and the programs and virtual machines thereon may be redundant to the routing server chassis 118 and the programs and virtual machines thereon if the virtual machines implemented in the routing server chassis 120 maintain virtual routers that are updated sufficiently similarly to the virtual routers simulated in the routing server chassis 118 such that the routing server chassis 120 can resume functions of the routing server chassis 118 within a particular time, such as 50 milliseconds for example.

In summary, the embodiment of FIG. 1 includes an apparatus including a first at least one processor circuit (the server blades of routing server chassis 118) configured to simulate interaction of a plurality of virtual network routers, and a second at least one processor circuit (the server blades of routing server chassis 120) configured to simulate the interaction of the plurality of virtual network routers redundantly to the simulated interaction of the plurality of virtual network routers on the first at least one processor circuit. Further, in the embodiment of FIG. 1, as described above, the first at least one processor circuit (the server blades of routing server chassis 118) is configured to configure at least one switch (the switch fabrics 114 and 116) to direct communication to at least one of a plurality of computers (the hosts 136, 140, and 144 and the core Internet routers 108, 110, and 112) according to at least one outcome of the simulated interaction of the plurality of virtual network routers on the first at least one processor circuit, and to configure a plurality of packet forwarding interfaces (102, 104, 122, 124, and 126) in communication with respective ports of the at least one switch to facilitate communication between the plurality of computers according to the at least one outcome of the simulated interaction of the plurality of virtual network routers on the first at least one processor circuit. Still further, in the embodiment of FIG. 1, as described above, the second at least one processor circuit is configured, in response to a failure of the first at least one processor circuit, to configure the at least one switch to direct communication to the at least one of the plurality of computers according to at least one outcome of the simulated interaction of the plurality of virtual network routers on the second at least one processor circuit, and to configure the plurality of packet forwarding interfaces to facilitate communication between the plurality of computers according to at least one outcome of the simulated interaction of the plurality of virtual network routers on the second at least one processor circuit.

Further, the virtual machine stores 198, 200, 210, and 212 implement virtual machines that may be referred to as "spare" virtual machines because those virtual machines are unused as shown in FIGS. 2 and 3. However, if one of the programs or virtual machines implemented on the routing server chassis 118 fails for some reason, then the corresponding redundant (or "hot standby") program or virtual machine implemented on the routing server chassis 120 may resume functions of the failed program or virtual machine, and further, one of the "spare" virtual machine stores 198, 200, 210, and 212 may then implement a program or virtual machine to function as a redundant (or "hot standby") program or virtual machine for the corresponding program or virtual machine that resumed functions of the failed program or virtual machine. Further, if one of the redundant (or "hot standby") programs or virtual machines implemented on the routing server chassis 120 fails for some reason, one of the "spare" virtual machine stores 198, 200, 210, and 212 may then implement a program or virtual machine to replace the failed redundant (or "hot standby") program or virtual machine.

In various embodiments, the O/S program codes 157, 161, 165, 179, 183, and 187 may apply various different algorithms for determining which spare virtual machine to use as a new redundant (or "hot standby") virtual machine for a program or virtual machine that resumed functions of a failed program or virtual machine. For example, such algorithms may ensure chassis redundancy, if possible, by implementing functions of the failed program or virtual machine in a spare virtual machine on a different chassis from the virtual machine that resumed the functions of the failed program or virtual machine. Other algorithms may account for available resources on various server blades, and implement the functions of the failed program or virtual machine in a spare virtual machine on a server blade having the most available resources. Still other algorithms may combine chassis redundancy with one or more available resource criteria, for example by implementing functions of the failed program or virtual machine in a spare virtual machine on a different chassis from the virtual machine that resumed the functions of the failed program or virtual machine as long as available resources on that different chassis are sufficient according to the one or more criteria.

Alternative embodiments may include still further potential fault tolerance. For example, referring to FIGS. 20 and 21, routing server chassis 410 and 412 according to an alternative embodiment are illustrated schematically. The routing server chassis 410 and 412 are substantially the same as the routing server chassis 118 and 120 described above and illustrated in FIGS. 2 and 3, except that each server blade in the routing server chassis 410 and 412 stores only one virtual machine store, and thus implements only one virtual machine. Although the embodiment shown includes three server blades in each of the routing server chassis 410 and 412, alternative embodiments may include more or fewer server blades in each routing server chassis.

More generally, the server blades according to various embodiments may implement any number of virtual machines, depending for example on the demands of the functions implemented by the virtual machines and the capacities of the server blades. Also, more generally, the virtual machines according to various embodiments may implement any number of virtual routers, depending for example on the demands of the virtual routers and the capacities of the virtual machines. In some embodiments, the network topology computing virtual machine codes may be executed in their own virtual machine, as shown in the virtual machine stores 196 (shown in FIG. 2).

Figure 20:
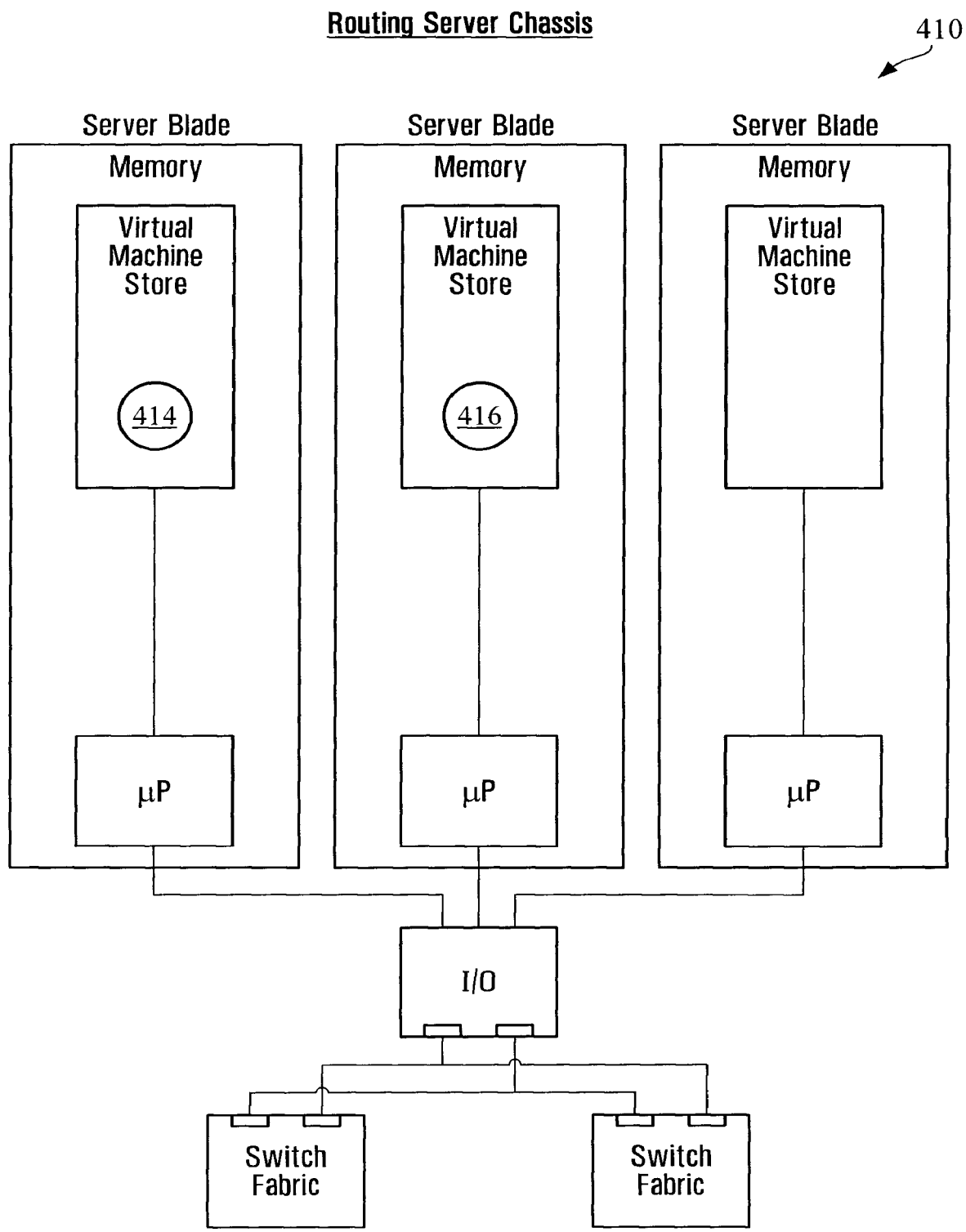
FIG. 20 is a schematic illustration of a routing server chassis according to another embodiment.
Figure 21:
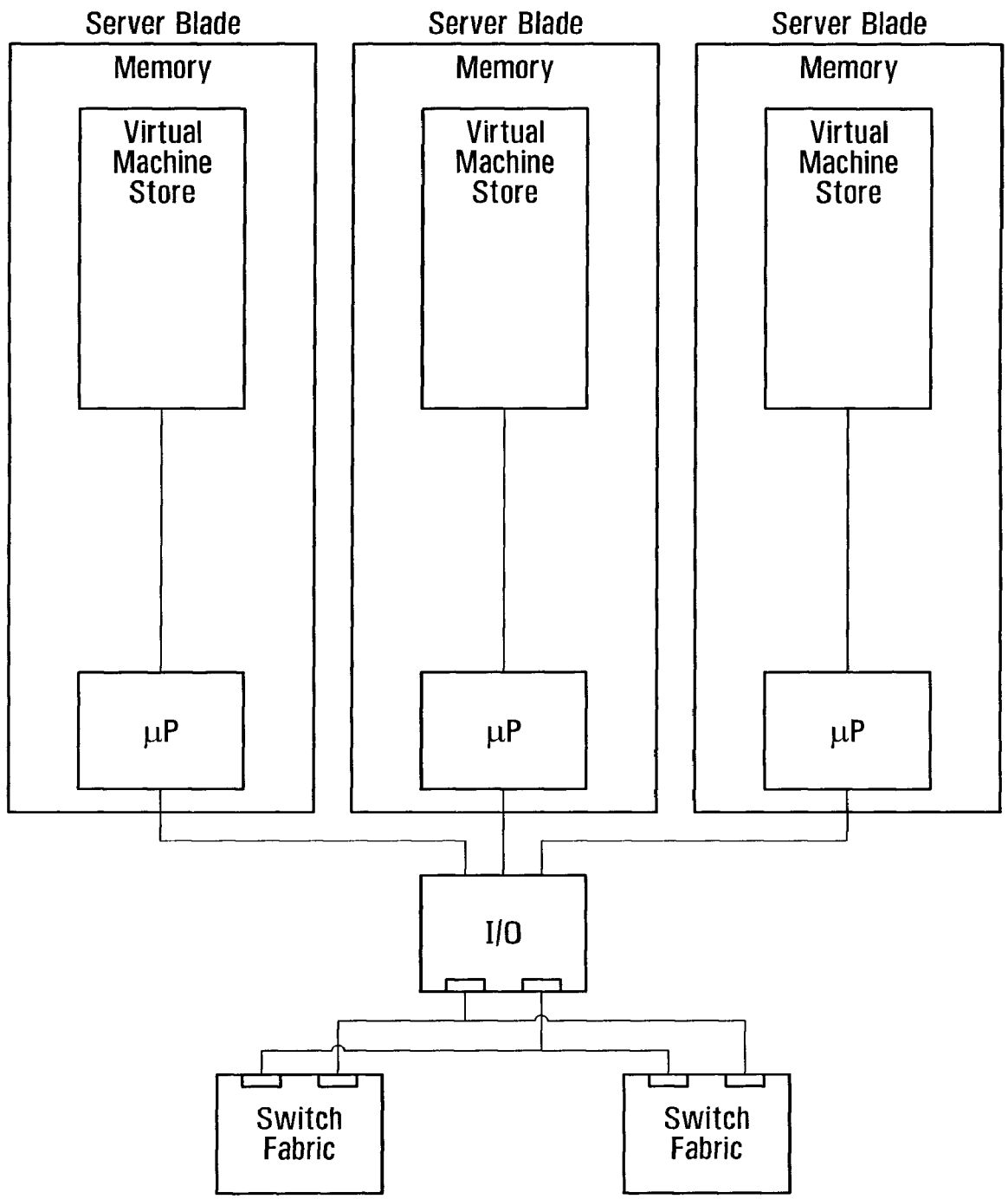
FIG. 21 is a schematic illustration of another routing server chassis according to the embodiment of FIG. 20.

In still other alternative embodiments, the server blades such as those shown in FIGS. 20 and 21 do not require virtual machines at all, but may implement the virtual router and network topology computing programs described above natively on the various server blades.

In the embodiments described herein, redundant (or "hot standby") server blades, redundant (or "hot standby") virtual machines, redundant (or "hot standby") virtual routers, and redundant (or "hot standby") network topology computing programs are implemented on a separate chassis from the virtual routers and network topology computing programs that they are redundant to for greater fault tolerance. Although the embodiments described above include only two routing server chassis, alternative embodiments may include more or fewer routing server chassis as indicated above. Some embodiments may include a large number of routing server chassis for greater chassis redundancy and to support a large number of server blades for greater redundancy of server blades, for example. However, regardless of the redundancy of the routing server chassis, the various routing server chassis in some embodiments may coordinate their communication with the packet forwarding interfaces and with the switch fabrics to ensure that effectively only one routing server is configuring the packet forwarding interfaces and the switch fabrics. The various routing server chassis therefore function together and may be referred to as a "routing server block".

In summary, embodiments such as those described above may replace similar resources from different routers of a point of presence ("PoP") with modular resources that are not limited to particular routers. In other words, embodiments such as those described above include resources (implemented by switch fabrics, packet forwarding interfaces, and routing server chassis in the embodiments described above) that may each be scaled for desired functionality and availability in particular PoPs, for example, without relying on discrete router apparatuses to provide such functionality. For example, the effective functions of respective switch fabrics from numerous routers in a PoP may be replaced with modular switch fabrics (such as the switch fabrics 114 and 116 in the embodiment of FIG. 1), and such modular switch fabrics may implement the functions of the switch fabrics of numerous discrete routers at significantly lower cost with significantly higher redundancy and availability with compared to other PoPs. As another example, the routing protocol and routing algorithm implementations of numerous routers may be implemented instead in modular routing server chassis (such as the routing server chassis 118 and 120 in the embodiment of FIG. 1), and again such modular routing server chassis may implement the routing protocol and routing algorithm functions of numerous discrete routers at significantly lower cost with significantly higher redundancy and availability with compared to other PoPs.

In general, embodiments such as those described above may have significantly higher availability than other PoPs because embodiments such as those described above can include greater redundancy than some other PoPs at a lower cost. For example, referring to the system 100 (shown in FIG. 1), redundant switch fabrics, redundant packet forwarding interfaces, redundant routing server chassis, and redundancy within each routing server chassis may all increase fault tolerance and availability beyond the fault tolerance and availability of other PoPs at lower costs than adding additional routers and additional high-speed interfaces between the numerous routers to add fault tolerance and availability to other PoPs.

Further, embodiments such as those described above may be significantly less costly than other PoPs because, for example, the components of the system 100 may be less costly than the numerous commercially available routers, and the numerous high-speed interfaces to interconnect such routers, that may be required in some PoPs.

Also, embodiments such as those described above may be more scalable than other PoPs because, for example, one or more additional WAN packet forwarding interfaces may be added as needed, one or more provider edge packet forwarding interfaces may be added as needed, one or more routing server chassis may be added as needed, one or more server blades may be added to the routing server chassis as needed, and one or more switch fabrics may be added or extended as needed. Costs of such additions may be significantly lower than costs of adding new routers and high-speed interfaces to other PoPs.

Still further, embodiments such as those described above may be configurable more easily and for a lower cost than when compared to other PoPs. For example, the provider edge packet forwarding interfaces (such as the provider edge packet forwarding interfaces 122, 124, and 126 in the embodiment of FIG. 1), each of which may be a single blade or a stack of blades, for example, may be configured differently depending on particular demands from their respective customer networks (such as the customer networks 134, 138, and 142 in the embodiment of FIG. 1). For example, one of the provider edge packet forwarding interfaces can be dedicated to the customer network of a premium customer, such as a bank or a government department for example, thereby providing enhanced network service to the customer network of the premium customer.

Also, in embodiments such as those described above, various services may be added to particular provider edge packet forwarding interfaces where such services may be desired. For example, one of the provider edge packet forwarding interfaces can be dedicated to a business network that requires a full Border Gateway Protocol ("BGP") routing table. As another example, one of the provider edge packet forwarding interfaces can be configured to provide Open Systems Interconnection ("OSI") layer three (network layer) virtual private network ("VPN") services to various customers, such as small or medium-sized customers, for example. Alternatively, one of the provider edge packet forwarding interfaces can be configured to provide OSI layer three VPN services to a large customer, such as a bank or a government department, for example. As other examples, one of the provider edge packet forwarding interfaces can be configured to provide one of: any-to-any broadcast-intensive OSI layer two (data link layer) services such as virtual private LAN services ("VPLS") and other Metro Ethernet Forum ("MEF") services; mobility backhaul services; high-availability services requiring an MPLS traffic engineering feature; multicast features such as broadcast video and Internet Protocol television ("IPTV"); and broadband remote access server ("BRAS") services, residential Internet services, or other services with many digital subscriber line access multiplexers ("DSLAMs"). In general, adding such services to particular packet forwarding interfaces, where such services may be desired, may be more secure than implementing all such services in an edge router, as may be required in some PoPs, because such services may be separated and offered in secured, dedicated, and isolated provider edge packet forwarding interfaces. Further, separating such services into particular packet forwarding interfaces, where such services may be desired, may be more cost-effective than separating such services in an edge router of another PoP because separating such services into particular provider edge packet forwarding interfaces does not require unnecessarily duplicating processor circuits.

The different configurations of the provider edge to meet these many different types of services can be implemented using a service templates approach. A standardized configuration template per service type, per customer, per location, or per department, for example, can be stored in a database and retrieved by a customer service management application. The database and the customer service management application can each be run by a respective dedicated virtual machine, or by one virtual machine in a routing server chassis. One example of a configuration template may be a bank requiring internet access to one of its branches. The configuration template belonging to the specific bank may have configuration parameters matching a subscribed QoS, bandwidth, and Internet service provider peering partners, and may be retrieved from the database. In addition, the bank may require network-based firewall and email spam filtering services, and such firewall and email filtering services may be included as part of the template and may be applied to the provider edge interface that will be connecting to the bank's branch.

Although specific embodiments have been described and illustrated, such embodiments should be considered illustrative only and not as limiting the invention as construed in accordance with the accompanying claims.

What is claimed is:

1. A method of configuring a plurality of network components, the method comprising:
   receiving at least one routing message, wherein the at least one routing message comprises at least one Network Layer Reachability Information ("NLRI") UPDATE message;
   simulating an interaction of a plurality of virtual network routers according to contents of the at least one routing message including the at least one NLRI UPDATE message; and
   configuring the plurality of network components to facilitate communication between a plurality of computers according to at least one outcome of the simulated interaction of the plurality of virtual network routers wherein the plurality of network components comprise:
   at least one switch; and
   a plurality of packet forwarding interfaces in communication with respective ports of the at least one switch, and
   wherein configuring the plurality of packet forwarding interfaces comprises configuring the plurality of packet forwarding interfaces to modify labels of frames of data according to the at least one outcome of the simulated interaction of the plurality of virtual network routers.

2. The method of claim 1 wherein simulating the interaction of the plurality of virtual network routers according to the contents of the at least one routing message comprises:
   simulating operation of a first one of the plurality of virtual network routers according to the contents of the at least one routing message to determine a next hop of a hypothetical packet from the first one of the plurality of virtual network routers according to the contents of the at least one routing message;
   if the next hop of the hypothetical packet from the first one of the plurality of virtual network routers according to the contents of the at least one routing message is a second one of the plurality of virtual network routers, then simulating operation of the second one of the plurality of virtual network routers according to the contents of the at least one routing message to determine a next hop of the hypothetical packet from the second one of the plurality of virtual network routers according to the contents of the at least one routing message; and if the next hop of the hypothetical packet from the first one of the plurality of virtual network routers according to the contents of the at least one routing message is not one of the plurality of virtual network routers, then configuring the at least one switch to direct packets represented by the hypothetical packet to the next hop of the hypothetical packet from the first one of the plurality of virtual network routers.

3. The method of claim 2 wherein configuring the plurality of network components to facilitate communication comprises configuring at least one switch to direct network packets according to labels of the network packets.

4. The method of claim 3 wherein configuring the at least one switch to direct network packets according to the labels of the network packets comprises storing, on at least one computer-readable medium in communication with the at least one switch, a representation of at least one label in association with a respective port of the at least one switch.

5. The method of claim 4 wherein storing the representation of the at least one label comprises storing a representation of at least one Multiprotocol Label Switching ("MPLS") label.

6. The method of claim 1 wherein configuring the plurality of packet forwarding interfaces to modify the labels of the frames of data according to the at least one outcome of the simulated interaction of the plurality of virtual network routers comprises configuring the plurality of packet forwarding interfaces to modify destination physical addresses of the frames of data according to the at least one outcome of the simulated interaction of the plurality of virtual network routers.

7. The method of claim 6 wherein configuring the plurality of packet forwarding interfaces to modify the destination physical addresses of the frames of data according to the at least one outcome of the simulated interaction of the plurality of virtual network routers comprises storing, on at least one computer-readable medium in communication with the plurality of packet forwarding interfaces, a representation of at least one destination network address in association with a respective at least one destination physical address.

8. The method of claim 7 wherein the at least one destination network address comprises at least one Internet Protocol ("IP") address.

9. The method of claim 1 wherein configuring the plurality of packet forwarding interfaces to modify the labels of the frames of data according to the at least one outcome of the simulated interaction of the plurality of virtual network routers comprises storing, on at least one computer-readable medium in communication with the plurality of packet forwarding interfaces, a representation of at least one label in association with a respective instruction.

10. The method of claim 9 wherein configuring the plurality of packet forwarding interfaces to modify the labels of the frames of data according to the at least one outcome of the simulated interaction of the plurality of virtual network routers comprises configuring the plurality of packet forwarding interfaces to add labels to the frames of data according to the at least one outcome of the simulated interaction of the plurality of virtual network routers.

11. The method of claim 10 wherein configuring the plurality of packet forwarding interfaces to add labels to the labels of the frames of data according to the at least one outcome of the simulated interaction of the plurality of virtual network routers comprises storing, on at least one computer-readable medium in communication with the plurality of packet forwarding interfaces, a representation of at least one destination network address in association with a respective at least one label.

12. The method of claim 11 wherein the at least one destination network address comprises at least one Internet Protocol ("IP") address.

13. The method of claim 1 wherein configuring the plurality of packet forwarding interfaces comprises configuring at least one provider edge packet forwarding interface.

14. The method of claim 1 wherein configuring the plurality of packet forwarding interfaces comprises configuring at least one wide area network ("WAN") packet forwarding interface.

15. The method of claim 1 wherein configuring the plurality of network components comprises configuring at least one switch fabric.

16. An apparatus for configuring a plurality of network components to communicate with a plurality of computers, the apparatus comprising:
at least one communication interface operable to communicate with the at least one switch and receive at least one routing message, wherein the at least one routing message comprises at least one Network Layer Reachability Information ("NLRI") UPDATE message; and
at least one processor circuit in communication with the at least one communication interface and configured to:
simulate interaction of a plurality of virtual network routers according to contents of the at least one routing message including the at least one NLRI UPDATE message; and
configure the plurality of network components to facilitate communication between a plurality of computers according to at least one outcome of the simulated interaction of the plurality of virtual network routers wherein the plurality of network components comprise:
at least one switch; and
a plurality of packet forwarding interfaces in communication with respective ports of the at least one switch, and
wherein configuring the plurality of packet forwarding interfaces comprises configuring the plurality of packet forwarding interfaces to modify labels of frames of data according to the at least one outcome of the simulated interaction of the plurality of virtual network routers.

17. A non-transitory computer-readable medium comprising instructions stored thereon for directing at least one computer to:
receive at least one routing message, wherein the at least one routing message comprises at least one Network Layer Reachability Information ("NLRI") UPDATE message;
simulate interaction of a plurality of virtual network routers according to contents of the at least one routing message including the at least one NLRI UPDATE message;
and
configure a plurality of network components to facilitate communication between a plurality of computers according to at least one outcome of the simulated interaction of the plurality of virtual network routers wherein the plurality of network components comprise:
at least one switch; and
a plurality of packet forwarding interfaces in communication with respective ports of the at least one switch, and wherein configuring the plurality of packet forwarding interfaces comprises configuring the plurality of packet forwarding interfaces to modify labels of frames of data according to the at least one outcome of the simulated interaction of the plurality of virtual network routers.

\* \* \* \* \*